(12) United States Patent
Immel

(10) Patent No.: US 8,672,491 B2
(45) Date of Patent: Mar. 18, 2014

(54) EYEGUARD WITH AUTOMATIC DIAPHRAGM

(75) Inventor: John M. Immel, Dallas, TX (US)

(73) Assignee: CMI Rubber Company, Inc., Garland, TX (US)

( * ) Notice: Subject to any disclaimer, the term of this patent is extended or adjusted under 35 U.S.C. 154(b) by 36 days.

(21) Appl. No.: 13/198,648

(22) Filed: Aug. 4, 2011

(65) Prior Publication Data

US 2012/0033282 A1 Feb. 9, 2012

Related U.S. Application Data

(60) Provisional application No. 61/370,706, filed on Aug. 4, 2010.

(51) Int. Cl.
- *G02B 21/00* (2006.01)
- *G02B 23/16* (2006.01)
- *G03B 11/04* (2006.01)
- *G02B 25/00* (2006.01)
- *F41G 1/38* (2006.01)

(52) U.S. Cl.
CPC ............... *G03B 11/04* (2013.01); *G02B 23/16* (2013.01); *G02B 25/001* (2013.01); *F41G 1/383* (2013.01)
USPC .......................... 359/600; 359/511; 359/611

(58) Field of Classification Search
USPC .......................................... 359/600, 611, 511
See application file for complete search history.

(56) References Cited

U.S. PATENT DOCUMENTS

| | | | | |
|---|---|---|---|---|
| 2,273,430 A * | 2/1942 | Bing | .............................. | 396/534 |
| 2,352,844 A * | 7/1944 | Loebe | ........................... | 359/611 |
| 3,390,931 A * | 7/1968 | Luning et al. | ................. | 359/600 |
| 3,594,062 A * | 7/1971 | Disley | ............................ | 359/600 |
| 3,669,523 A * | 6/1972 | Edwards, Jr. | .................. | 359/600 |
| 4,307,931 A * | 12/1981 | Blake | ............................ | 359/600 |
| 4,601,540 A * | 7/1986 | Karning et al. | ................ | 359/234 |
| 5,225,932 A * | 7/1993 | Wannagot et al. | ............ | 359/611 |
| 5,623,367 A * | 4/1997 | Immel | ............................. | 359/600 |
| 2003/0063386 A1* | 4/2003 | Slawson et al. | ................ | 359/600 |
| 2009/0002823 A1* | 1/2009 | Law et al. | ....................... | 359/511 |
| 2010/0166415 A1* | 7/2010 | Kamata | .......................... | 396/448 |

* cited by examiner

*Primary Examiner* — Thomas K Pham
*Assistant Examiner* — Cara Rakowski
(74) *Attorney, Agent, or Firm* — Howison & Arnott, L.L.P.

(57) ABSTRACT

An eyeguard for use on the eye-end of an optical instrument is provided having an instrument-end member adapted for connection to the optical instrument, an eye-end member adapted to interface with the periocular portion of the user's face, a hinge member disposed between the instrument-end and eye-end members having two flexible annular hinges, and a diaphragm comprising a plurality of segments attached to the interior of the hinge member between the annular hinges. The force of the user's eye pressing the eye-end member toward the instrument-end member deforms the annular hinges such that the normally closed diaphragm segments move to an open position, allowing light to pass through the eyeguard.

11 Claims, 19 Drawing Sheets

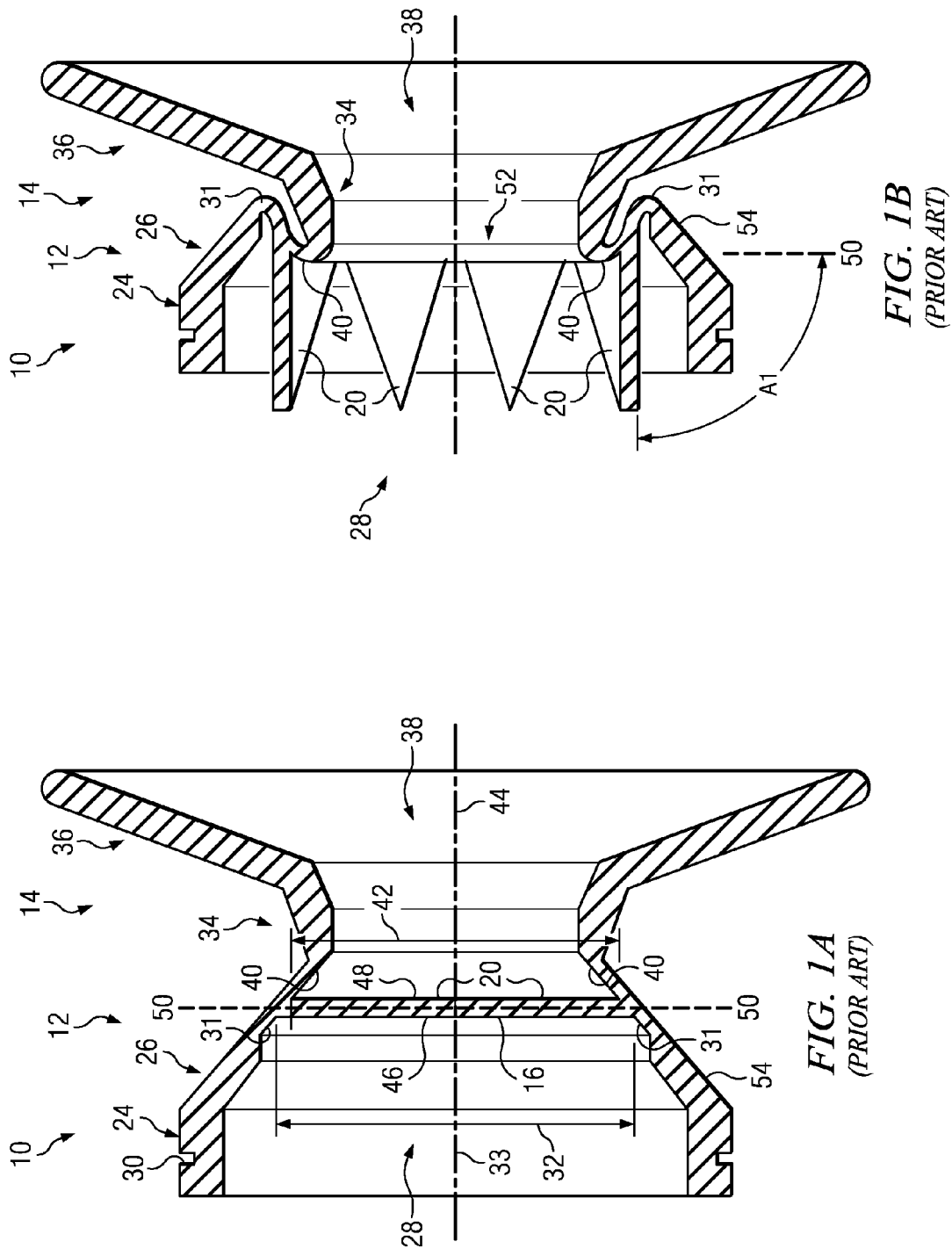

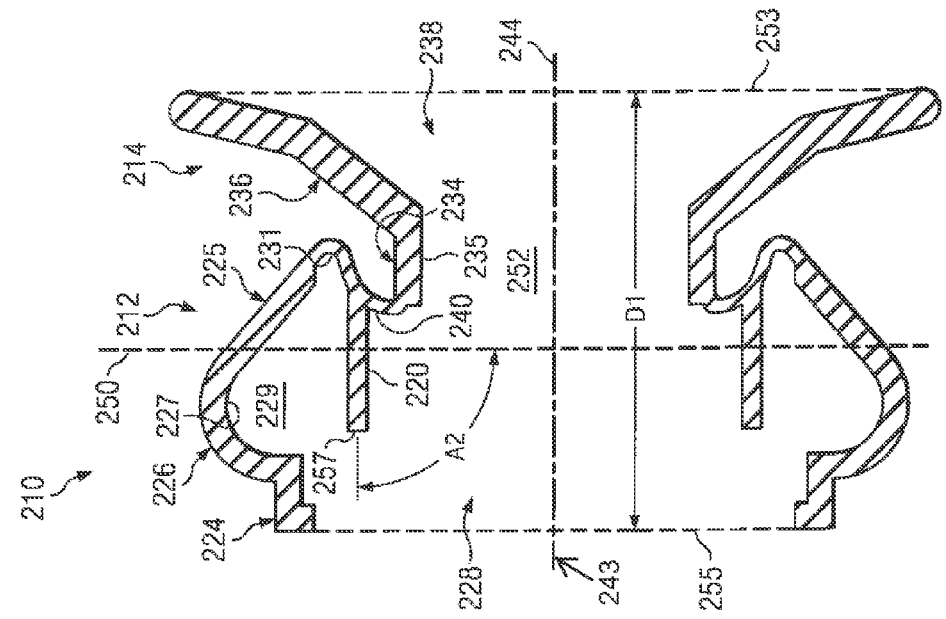
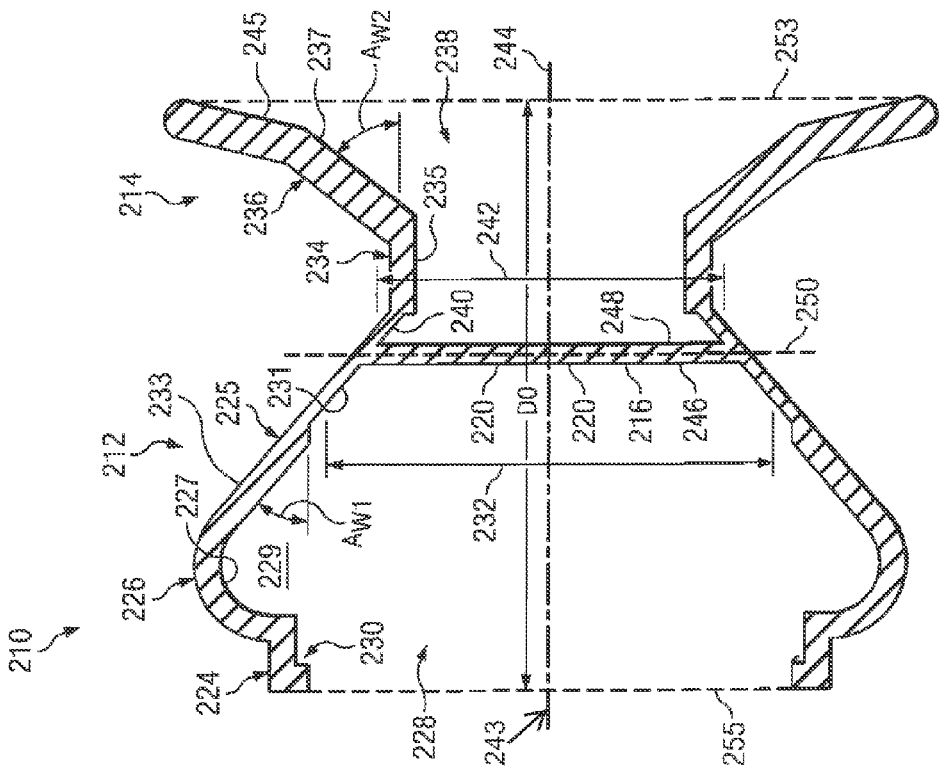

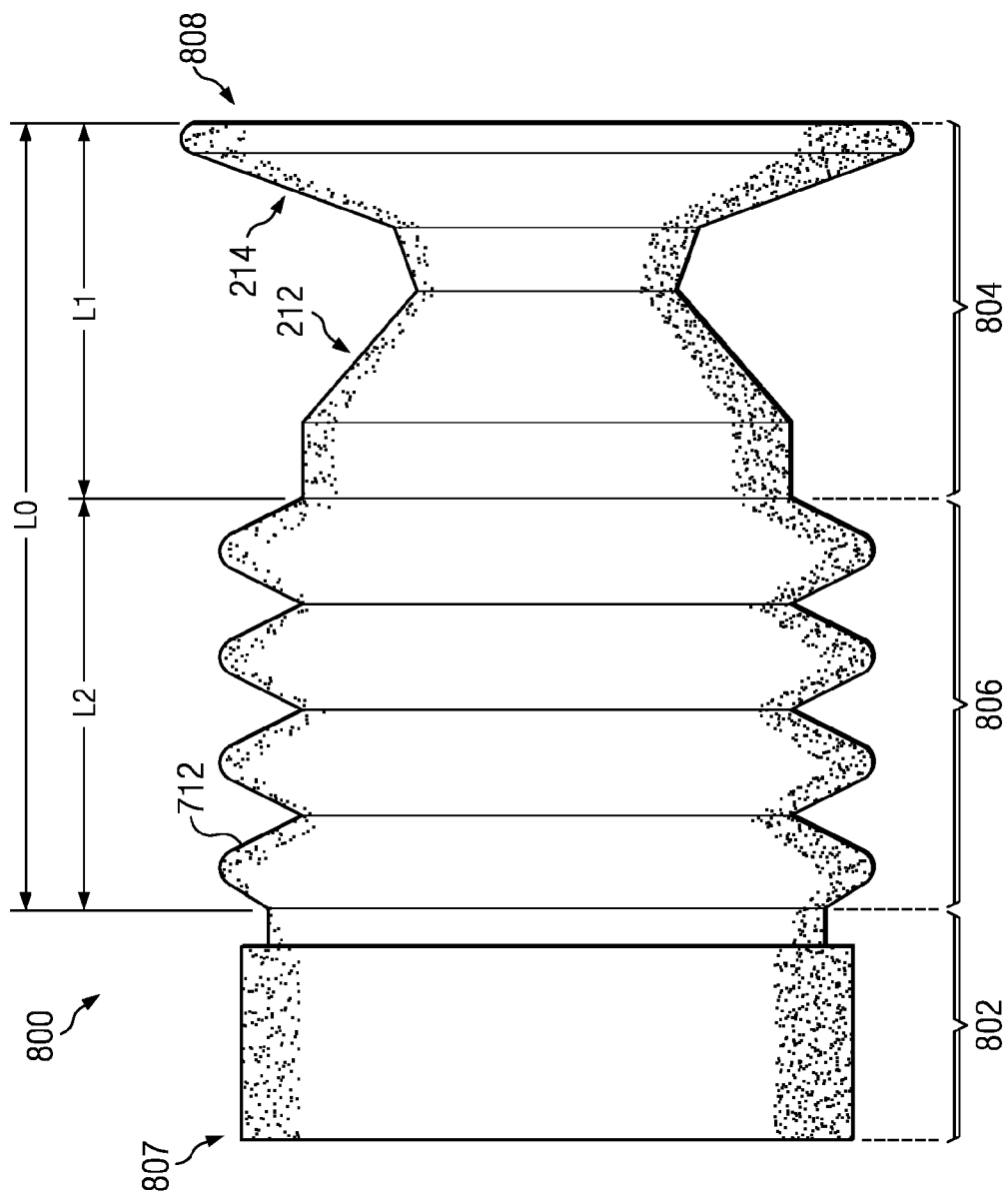

EYEGUARD WITH AUTOMATIC DIAPHRAGM

CROSS-REFERENCE TO RELATED APPLICATIONS

This application claims the benefit of U.S. Provisional Application No. 61/370,706, filed Aug. 4, 2010, and entitled EYEGUARD WITH AUTOMATIC DIAPHRAGM."

TECHNICAL FIELD

The present invention relates to an eyeguard for positioning a user's eye in a working relationship with a telescope, binoculars or similar optical apparatus. More specifically, the present invention relates to an eyeguard having an internal diaphragm, which is selectively opened by the action of the user pressing his eye against the eyeguard, allowing the user to position his eye at a range of user-selectable distances from the optical apparatus.

BACKGROUND

It has long been known to enhance the comfort, convenience and utility of telescopes, binoculars and other such optical apparatus by providing these devices with an eyeguard to interface between the user's eye and the optical instrument. Eyeguards often take the form of a flexible rubber rim or cup extending from the eyepiece of the optical instrument. The eyeguard typically allows the user to comfortably position his eye against the instrument, assists the user in maintaining the proper eye relief distance, (i.e., the distance from the eye-end lens of the optical instrument to the user's eyeball) to provide the user with full field of view, and to shield the user's eye from ambient or reflected light, which may distract from the image transmitted through the optical instrument.

Enhanced vision devices comprise a class of optical, electro-optical and/or video instruments that employ light amplification, infrared or thermal imaging, video displays or other technologies to provide enhanced images and/or information to the user. In some cases, enhanced vision devices allow the user to see under low-light or smoke-obscured conditions where conventional optical instruments would be ineffective. In other cases, enhanced vision devices provide sensor outputs (e.g., target range data) directly within the instrument's eyepiece. Examples of such enhanced vision devices include night vision goggles, starlight scopes, and thermal sights. Such devices find a wide range of applications including personnel-carried night vision goggles, weapon-mounted targeting scopes, and vehicle-mounted viewers and sights.

The use of enhanced vision devices at night or in other circumstances of darkness presents a problem for conventional eyeguards, especially when used under circumstances involving personal danger such as combat or law enforcement activities. It will be appreciated that, when an enhanced vision device is being used, light is emitted from the eyepiece. This emitted light primarily strikes the user's eye, and any excess light is blocked by the user's face pressing against the eyeguard as he looks through the instrument. However, when the user moves his eye back from the eyeguard, the emitted light continues projecting back from the end of the instrument, and may reflect from the user's face, clothing or surroundings. This "light leakage" may serve to disclose (i.e., to the enemy) the otherwise concealed position of the user. Conventional rim- or cup-type eyeguards provide little protection against "light leakage" from the eyepiece of an optical instrument; however, eyeguards having an automatic diaphragm that opens when the user's face presses against it and closes when the user's face is withdrawn, are known to address this problem. In particular, U.S. Pat. No. 5,623,367 to the current inventor discloses such an eyeguard with an automatic diaphragm. U.S. Pat. No. 5,623,367 is hereby incorporated by reference herein in its entirety.

For many optical devices, automatic eyeguards of the type disclosed in U.S. Pat. No. 5,623,367 serve to satisfactorily position the user's eye and prevent unwanted light leakage. However, such prior art automatic eyeguards may not be suitable for all devices because they tend to have a relatively small range of travel (i.e., in the eye-to-eyepiece direction) once the diaphragm is open, whereas some optical devices may require an eyeguard allowing a relatively long range of travel after the diaphragm is open. For example, some enhanced vision devices may require a range of travel between a first eye-to-lens distance optimal for a first purpose (e.g., good field of view) and a second eye-to-lens distance optimal for a second purpose (e.g., to read range data displayed in the eyepiece). A need exists, therefore, for an eyeguard having an automatic diaphragm that allows increased range of travel after the diaphragm is fully opened.

SUMMARY

An object of the present invention is to provide an eyeguard, which automatically prevents light from entering into or exiting from the eye-end lens of an optical instrument when not in use. Accordingly, the current invention provides a resilient eyeguard having an instrument-end member, an eye-end member, and a diaphragm located therebetween. The instrument-end member has a first portion adapted for connecting the eyeguard to the optical instrument and a second portion comprising a first flexible annular hinge. The eye-end member has a front portion comprising a second flexible annular hinge having a diameter less than that of the first flexible annular hinge and rear portion comprising a disk adapted to interface with the periocular region of the user's face which surrounds the eye. The diaphragm comprises a plurality of segments, each having a front side joined to the first flexible annular hinge and a rear side joined to the second flexible annular hinge. The diaphragm has a closed state and an open state, wherein when the diaphragm is in the closed state, the diaphragm segments are configured so as to block the passage of light rays through the eyepiece, whereas, when the diaphragm is in the open state, the diaphragm segments are configured so as to allow the passage of light rays through the eyepiece. By pressing the eye against the periocular pad, the user can cause relative motion between the instrument-end member and the eye-end member of the eyeguard such that the eyeguard will be deformed at the first and second annular hinge. This causes the diaphragm segments to move from a closed state to an open state as the user pushes forward on the periocular pad. When the user releases pressure from the periocular pad, the resilience of the hinge material causes the eye-end member to return to its original position such that the first and second annular hinges return to their original position and the diaphragm segments return to their normal closed position.

BRIEF DESCRIPTION OF THE DRAWINGS

For a more complete understanding, reference is now made to the following description taken in conjunction with the accompanying Drawings in which:

FIG. 1A is an elevation view, in cross-section, showing an eyeguard according to the PRIOR ART with the diaphragm in the closed position;

FIG. 1B shows the PRIOR ART eyeguard of FIG. 1A with the diaphragm in the open position;

FIG. 2A is an elevation view of a midpoint wall section showing an eyeguard according to one embodiment of the current invention with the diaphragm in the closed position;

FIG. 2B shows the eyeguard of FIG. 2A with the diaphragm in the fully open position and the eye-end member at a first eye-to-lens distance;

FIG. 8A is an elevation view of yet another eyeguard according to yet another embodiment.

DETAILED DESCRIPTION

Figure 2C:
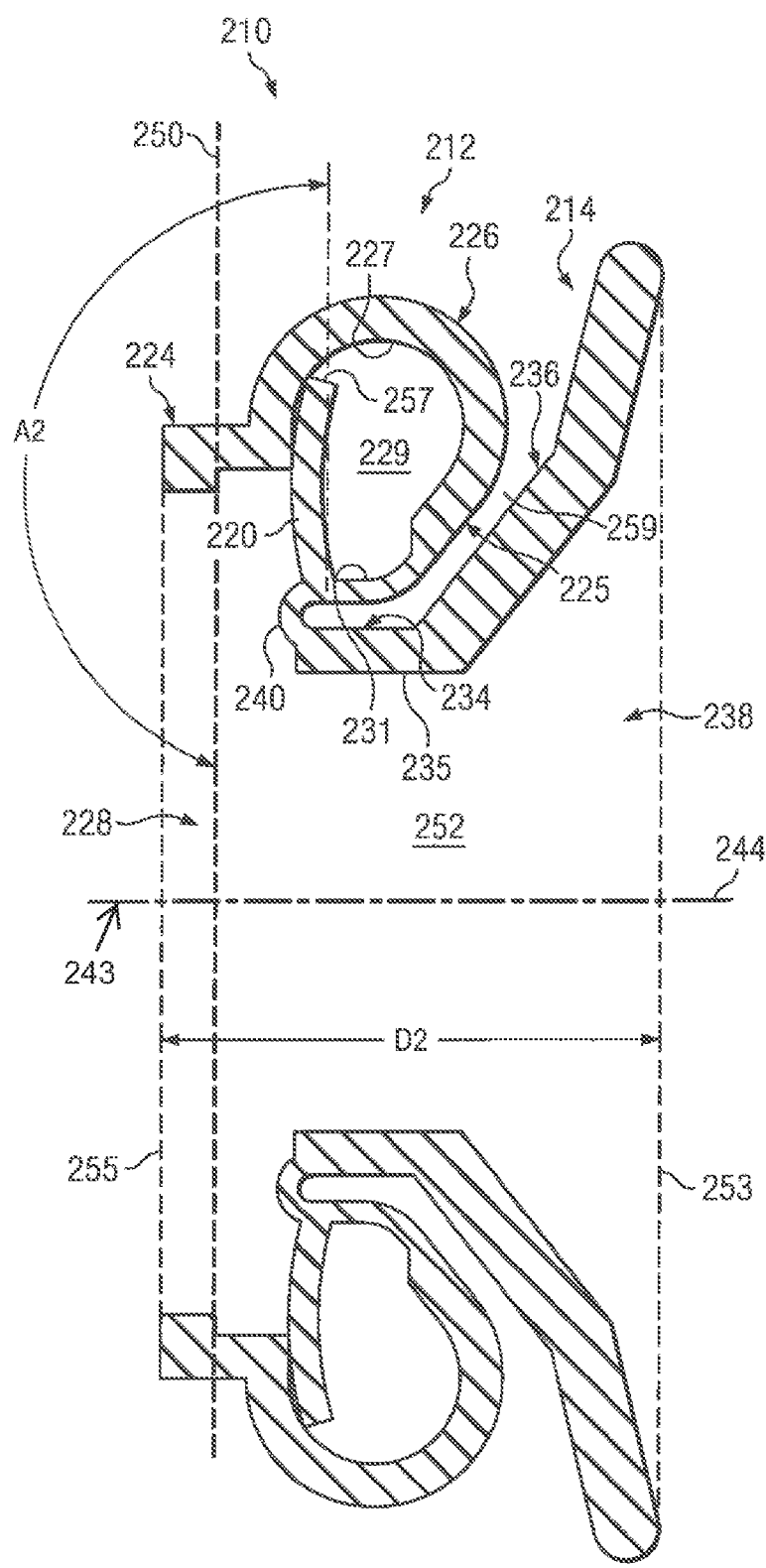
FIG. 2C shows the eyeguard of FIG. 2A with the diaphragm in the fully open position and the eye-end member at a second eye-to-lens distance.

Referring now to the drawings, wherein like reference numerals designate like or corresponding parts throughout the similar views, and in particular to FIGS. 1A and 1B, an eyeguard is illustrated in accordance with the PRIOR ART as disclosed in U.S. Pat. No. 5,623,367. PRIOR ART eyeguard 10 is shown in cross-section, revealing instrument-end member 12, eye-end member 14 and diaphragm 16. Instrument-end member 12 has a first portion 24, a second portion 26 and a first passageway 28 therethrough. First portion 24 of instrument-end member 12 is adapted for connection to an optical instrument. This adaptation may take the form of an annular notch 30 designed to interface with a complementary feature on the optical instrument. Alternatively, first portion 24 of instrument-end member 12 may further comprise a rigid adapter such as a metallic ring, a polymer ring or other similar fitting so as to specifically adapt instrument-end member 12 for connection to the optical instrument of choice. Second portion 26 of instrument-end member 12 includes a first flexible annular hinge 31 having a first diameter 32. First passageway 28 of instrument-end member 12 has a first longitudinal axis 33 alignable with the optical path of the selected optical instrument.

Referring still to FIGS. 1A and 1B, the eye-end member 14 has a third portion 34, a fourth portion 36 and a second passageway 38 therethrough. Third portion 34 includes a second flexible annular hinge 40 having a second diameter 42, said second diameter 42 being less than first diameter 32 of first annular hinge 31. Second passageway 38 of eye-end member 14 has a second longitudinal axis 44 generally aligned with first longitudinal axis 33 of instrument-end member 12. Fourth portion 36 of eye-end member 14 is adapted to interface with the periocular region (i.e., the region surrounding the eye) of the user's face. Accordingly, fourth portion 36 may be formed as an annular disc or conic section symmetrically aligned around second longitudinal axis 44. Alternatively, fourth portion 36 may take the form of a disc or conic section which is angled with relation to second longitudinal axis 44 to provide increased user comfort in certain situations. Further, fourth portion 36 may take the form of an irregularly shaped surface designed to interface with the facial structure of the user. Diaphragm 16 is disposed between instrument-end member 12 and eye-end member 14. Diaphragm 16 comprises a plurality of segments 20, each segment 20 having an instrument-end side 46 joined to first flexible annular hinge 31 and an eye-end side 48 joined to second flexible annular hinge 40. Each segment 20 is movable between a closed position and an open position.

Referring specifically to FIG. 1A, diaphragm 16 is shown in a closed position, wherein segments 20 are disposed in a common plane 50 that intersects, and lies generally perpendicular to, the first and second longitudinal axes 33, 44, respectively, thereby blocking the passage of light rays between first passageway 28 and second passageway 38. Referring now to FIG. 1B, diaphragm 16 is shown in the open position, wherein segments 20 are positioned so as to allow the passage of light through aperture 52 between first passageway 28 and second passageway 38. The transition between the diaphragm closed position, shown in FIG. 1A, and the diaphragm open position, shown in FIG. 1B, is effected by means of a longitudinal movement of eye-end member 14 with respect to instrument-end member 12. Due to the size difference between first diameter 32 of first annular hinge 31 and second diameter 42 of second annular hinge 40, the relative motion of eye-end member 14 with respect to instrument-end member 12 causes second annular hinge 40 to move longitudinally through the annulus of first annular hinge 31, as shown in FIG. 1B. The deformation of annular hinges 31 and 40 causes diaphragm segments 20 to move into the open position as shown in FIG. 1B. When the user removes his eye from the eyeguard, the natural resilience of annular hinges 31 and 40 causes eye-end member 14 to move with respect to instrument-end member 12 until the closed position shown in FIG. 1A is again attained.

It will be appreciated that due to the geometry of the first and second hinges 31 and 40, the diaphragm segments 20, when in the fully opened position, form an angle A1 with respect to the common plane 50 that is generally perpendicular, i.e., within the range from about 85 degrees to about 115 degrees. These generally longitudinally protruding diaphragm segments 20 may limit the available range of travel (i.e., in the longitudinal direction) of the eye-end member 14 toward the optical instrument if the segments encounter (i.e., come in contact with) the lens, display or other portion of the instrument. If there is no interference with the open diaphragm segments 20, then the available range of travel of the eye-end member 14 toward the optical instrument ends when the exterior surface of first hinge 31 abuts the corresponding exterior surface of the eye-end member (as best seen in FIG. 1B).

Referring now to FIGS. 2A, 2B and 2C, an eyeguard is illustrated in accordance with one embodiment of the current invention. It will be appreciated that, for purposes of illustration, only a section through the wall of the eyeguard is shown, i.e., the structure beyond the section plane is not shown. The eyeguard 210 comprises an instrument-end member 212, an eye-end member 214 and a diaphragm 216. The instrument-end member 212 has a first portion 224 disposed proximate to the instrument end, a second portion 225 disposed proximate to the eye end and a third portion 226 disposed therebetween. A first passageway 228 is defined therethrough. The first portion 224 of instrument-end member 212 may be adapted for connection to the eyepiece (not shown) of an optical instrument or other vision device. In the embodiment shown, this adaptation takes the form of an annular notch 230 designed to interface with a complementary feature on the optical instrument; however, in other embodiments, adaptations having different configurations suited to the relevant optical instrument may be used. Alternatively, the first portion 224 of instrument-end member 212 may further comprise a rigid adapter (not shown) such as a metallic ring, a polymer ring or other similar fitting so as to specifically adapt the instrument-end member 212 for connection to the optical instrument of choice.

The second portion 225 of the instrument-end member 212 includes a first flexible annular hinge 231 having a first diameter 232 and an annular conic section 233 disposed on the instrument-end side of the first annular hinge. The annular conic section 233 has a wall thickness that is materially greater than the wall thickness of the first annular hinge 231, and the wall defines a first angle, $A_{W1}$, with respect to the longitudinal axes 243, 244 of the eyeguard. In preferred embodiments, the value of the angle $A_{W1}$ is within the range of about 42 degrees to about 48 degrees. In more preferred embodiments, the value of the angle $A_{W1}$ is about 45 degrees. The third portion 226 of the instrument-end member 212 is disposed between the first portion 224 and the second portion 225. The third portion 226 includes an inward-curving bight 227 that defines a bay or pocket 229 in the interior volume of the eyeguard. The first passageway 228 of the instrument-end member 212 has a first longitudinal axis 243 alignable with the optical path of the associated optical instrument.

Referring still to FIGS. 2A, 2B and 2C, the eye-end member 214 has a fourth portion 234, a fifth portion 236 and a second passageway 238 therethrough. The fourth portion 234 includes a second flexible annular hinge 240 having a second diameter 242, the second diameter 242 being less than first diameter 232 of the first annular hinge 231. Generally speaking, the respective diameters 232 and 242 of the first and second annular hinges 231 and 240 are measured to the areas where maximum curvature will occur when the annular hinges are flexed open. In the embodiment shown, the fourth portion 234 further includes a generally cylindrical section 235 extending longitudinally between the second annular hinge 240 and the fifth portion 236, this cylindrical section having a wall thickness materially thicker than the thickness of the second annular hinge. As further described herein, when included on the fourth portion 234, the cylindrical section 235 increases the available range of travel (i.e., with the diaphragm 216 fully open) of the eye-end member 214 toward the optical instrument before such travel is stopped by contact between the exterior surface of the eye-end member and an exterior portion of the instrument-end member 212.

The second passageway 238 of eye-end member 214 has a second longitudinal axis 244 generally aligned with the first longitudinal axis 243 of the instrument-end member 212. The fifth portion 236 of the eye-end member 214 includes an eye-end section 245 and an annular conic section 237. The eye-end section 245 is adapted to interface with the periocular region (i.e., the region surrounding the eye) of the user's face. Accordingly, the eye-end section 245 may be formed as an annular disc or conic section symmetrically aligned around the second longitudinal axis 244. Alternatively, the eye-end section 245 may take the form of an irregularly shaped surface designed to interface with the facial structure of the user. The annular conic section 237 of the fifth portion 236 defines (when viewed in cross-section) a second angle, $A_{W2}$, with respect to the longitudinal axes 243, 244 of the eyeguard. Preferably, the value of the angle $A_{W2}$ defined by the fifth portion annular conic section 237 is greater than the value of the angle $A_{W1}$ defined by the second portion annular conic section 233. In more preferred embodiments, the value of the angle $A_{W2}$ of conic section 237 is within a range that is from 8 degrees to 12 degrees greater than the value of the angle $A_{W1}$ of the conic section 233. In other preferred embodiments, the value of the angle $A_{W2}$ is within the range of about 53 degrees to about 62 degrees. In more preferred embodiments, the value of the angle $A_{W2}$ is within the range of about 55 degrees to about 60 degrees.

The diaphragm 216 is disposed between the instrument-end member 212 and the eye-end member 214. The diaphragm 216 comprises a plurality of segments 220, each segment 220 having an instrument-end side 246 joined to first flexible annular hinge 231 and an eye-end side 248 joined to second flexible annular hinge 240. Each segment 220 is movable between a closed position (FIG. 2A) and an open position (FIGS. 2B and 2C).

Referring now specifically to FIG. 2A, the diaphragm 216 is shown in a closed position, wherein the segments 220 are disposed in a common plane 250 that intersects, and lies generally perpendicular to, the first and second longitudinal axes 243, 244, respectively, thereby blocking the passage of light rays between the first passageway 228 and the second passageway 238. The configuration illustrated in FIG. 2A is the "relaxed" or "natural" configuration of the eyeguard, i.e., the configuration it assumes when not subjected to external forces. The user's eye-to-lens distance D0 in the closed position is approximated by the distance from the eye-end boundary 253 to the instrument-end boundary 255.

Referring now specifically to FIG. 2B, when the eye-end member 214 is first pushed longitudinally (along axis 243) toward the instrument-end member 212, the size difference between first diameter 232 of first annular hinge 231 and second diameter 242 of second annular hinge 240 (see FIG. 2A) causes the hinges 231 and 240 to flex and reverse their relative longitudinal positions. This, in turn, causes the diaphragm 216 to move into the first fully open position shown in FIG. 2B. It will be appreciated that the term "fully open" as applied to the diaphragm 216 merely means that the segments 220 have moved into a configuration wherein the segments do not obstruct the passage of light through the aperture 252 between the first passageway 228 and the second passageway 238. If the user removes his eye from the eyeguard, the natural resilience of the annular hinges 231 and 240 causes the eye-end member 214 to move with respect to the instrument-end member 212 until the closed position shown in FIG. 2A is again attained.

When the diaphragm segments 220 of the eyeguard 210 are in the first fully open position as shown in FIG. 2B, the segments form an angle A2 (i.e., with respect to the common plane 250) that is generally perpendicular, i.e., within the range from about 85 degrees to about 115 degrees. In some respects, this is similar to the open configuration of the PRIOR ART eyeguard 10 shown in FIG. 1B. However, unlike the PRIOR ART eyeguard 10, when the eyeguard 210 is in the first fully open position, the exterior surface of the first annular hinge 231 is still materially spaced-apart from the corresponding exterior surface of the eye-end member 214 (in this case, the exterior surface of the fifth portion 236). In the first fully open position, the user's eye-to-lens distance (again approximated by the distance from the eye-end boundary 253 to the instrument-end boundary 255) is a first distance D1.

Referring now specifically to FIG. 2C, as the eye-end member 214 is pushed longitudinally past the first fully open position (FIG. 2B) toward the instrument-end member 212, the diaphragm segments 220 are carried by the hinges 231 and 240 and continue to rotate outwards (while simultaneously translating longitudinally) until the outer ends 257 of the segments enter the pocket 229 formed by the inward-curving bight 227 of third portion 226. Once trapped in the pocket 229, the ends 257 of the segments 220 are bent outward as the eye-end member 214 continues to translate longitudinally into the instrument-end member 212. This prevents the segments 220 from hitting the eyepiece of the adjacent optical instrument or otherwise limiting the movement of the eye-end member 214. The translation of the eye-end member 214 finally stops when part of the eye-end member (in this case, the fifth portion 236) abuts part of the instrument-end member 212 (in this case, the second portion 225) in the area generally indicated by reference numeral 259 (FIG. 2C). This may be termed a second fully open position. For clarity of illustration, a space is still shown in the area 259 in FIG. 2C; however, it will be understood that contact will occur in this area when the eyeguard 210 is in the second fully open position. It will be appreciated that the diaphragm segments 220 remain out of the aperture 252 between first passageway 228 and second passageway 238 throughout the range of travel between the first fully open position and the second fully open position.

When the diaphragm segments 220 are in the second fully open position as shown in FIG. 2C, the segments form an angle A2 with respect to the common plane 250 that is now substantially greater than perpendicular, i.e., well in excess of about 115 degrees. In some embodiments, the angle A2 at the second fully open position exceeds 135 degrees, and in preferred embodiments, the angle A2 exceeds 160 degrees. In the second fully open position, the user's eye-to-lens distance (still approximated by the distance from boundary 253 to boundary 255) is a second distance D2. The difference between the distance D1 and the distance D2 (i.e., D1-D2) represents the "user-selectable" eye-to-lens travel of the eyeguard 210. In preferred embodiments, the value D1-D2 of the user-selectable eye-to-lens travel of the eyeguard 210 after the diaphragm 216 is fully open (i.e., between the first and second fully open positions) is substantially equal to the value D0-D1 of the "required" eye-to-lens travel necessary to move from the fully closed position to the first fully open position. In some embodiments, the value D1-D2 of the user-selectable eye-to-lens travel of the eyeguard 210 is within the range of about 50% to 150% of the value D0-D1 of the required eye-to-lens travel. In other embodiments, the value D1-D2 of the user-selectable eye-to-lens travel of the eyeguard 210 is within the range of about 75% to 125% of the value D0-D1 of the required eye-to-lens travel.

Figure 2D:
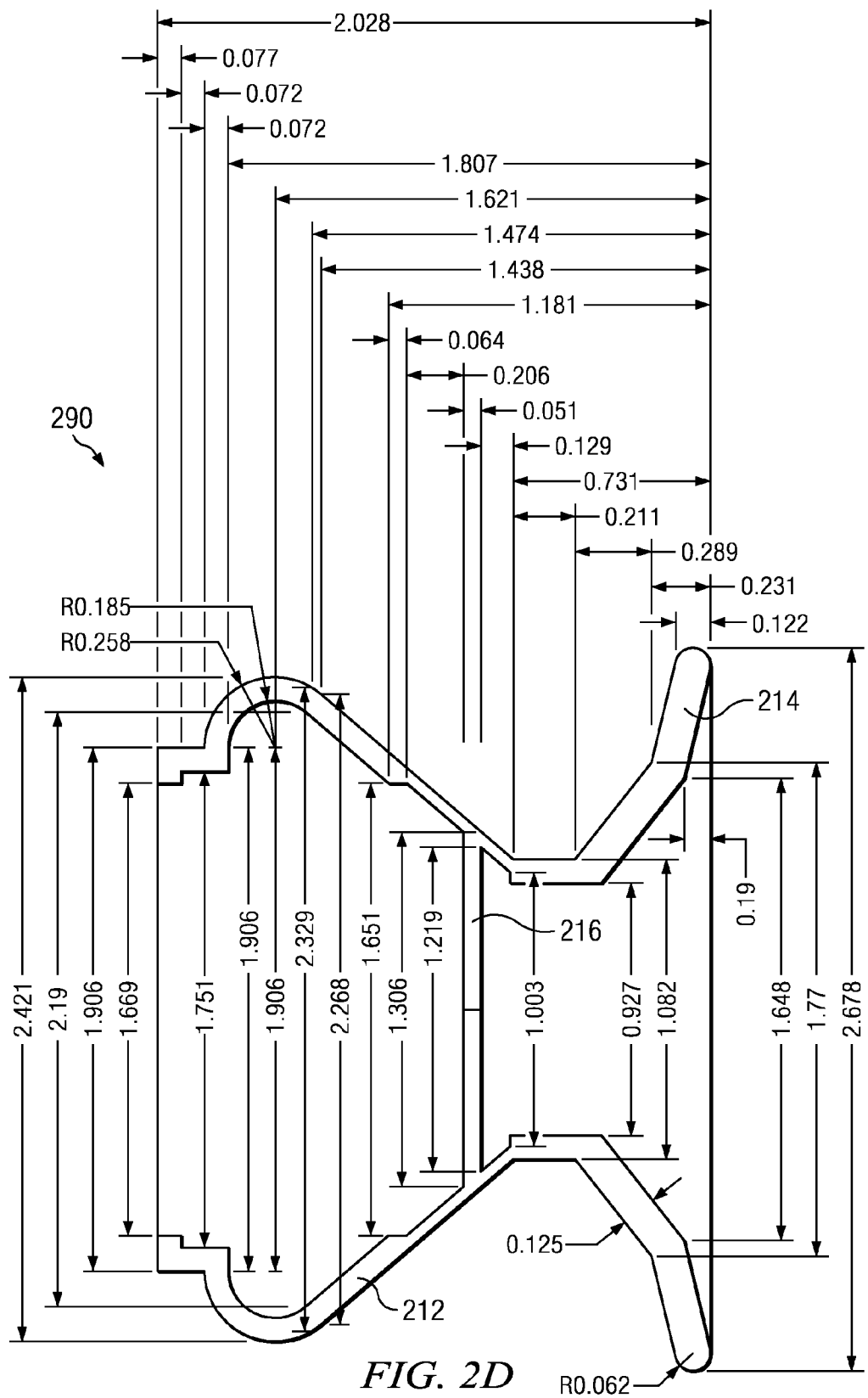
FIG. 2D is an elevation view of an eyeguard in accordance with another embodiment with exemplary dimensions.

Referring now to FIG. 2D, there is illustrated an eyeguard 290 in accordance with another embodiment. Eyeguard 290 is shown with exemplary dimensions (denominated in inches) believed to provide good results, however, other dimensions can be used in accordance with the disclosure. The general structure is comparable to that of eyeguard 210, therefore the corresponding parts are not separately numbered.

Figure 3A:
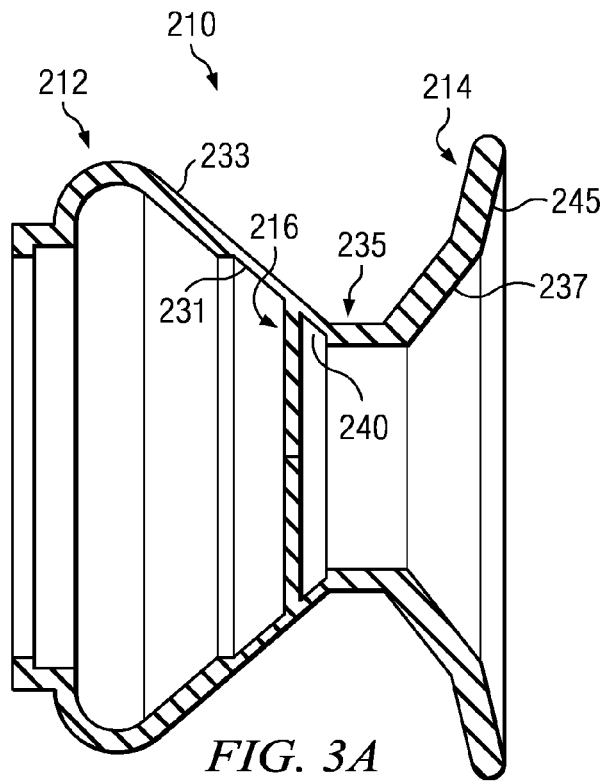
FIG. 3A is an elevation view, in cross-section, showing the eyeguard of FIGS. 2A-2C with the diaphragm in the fully closed position as shown in FIG. 2A.
Figure 3B:
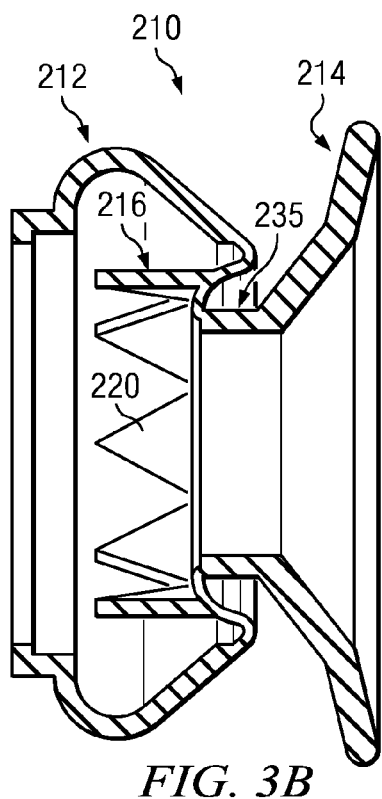
FIG. 3B is an elevation view, in cross-section, showing the eyeguard of FIGS. 2A-2C with the diaphragm in the fully open position and the eye-end member at a first eye-to-lens distance as shown in FIG. 2B.
Figure 3C:
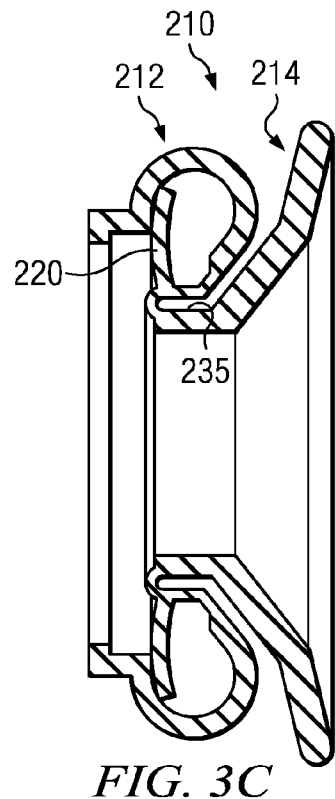
FIG. 3C is an elevation view, in cross-section, showing the eyeguard of FIGS. 2A-2C with the diaphragm in the fully open position and the eye-end member at a second eye-to-lens distance as shown in FIG. 2C.
Figure 4A:
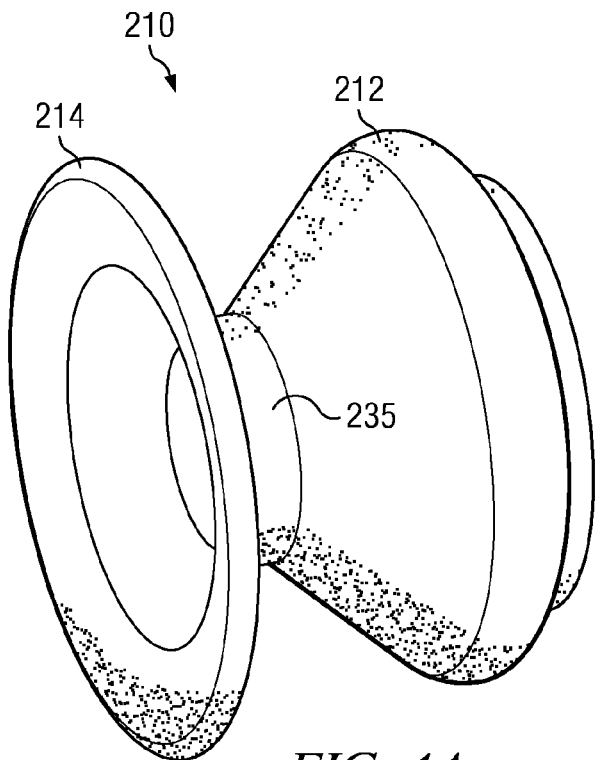
FIG. 4A shows a side perspective view of an eyeguard in accordance with another embodiment with the diaphragm in the fully closed position.
Figure 4B:
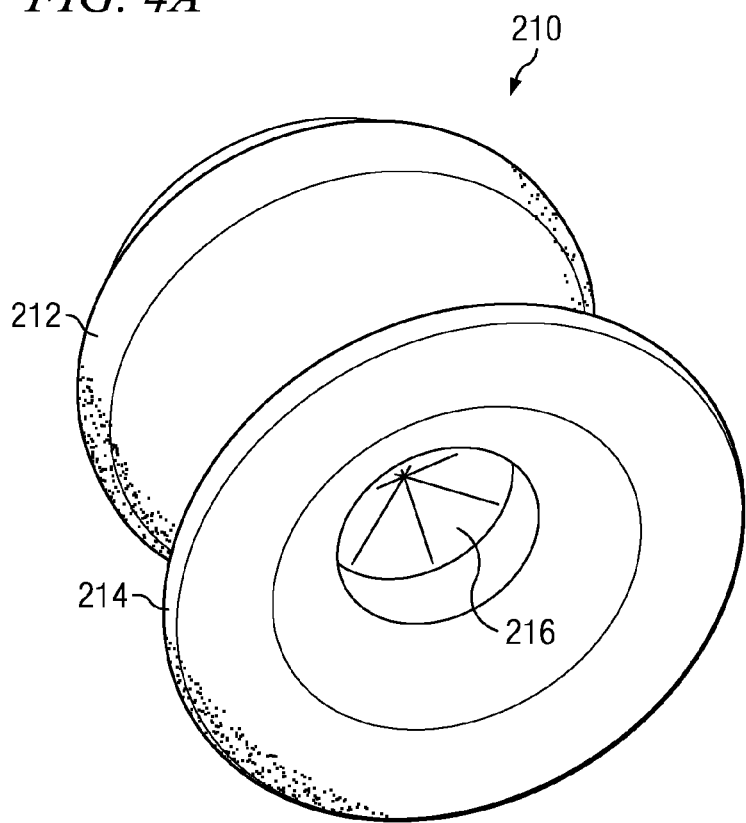
FIG. 4B shows an eye-end perspective view of the eyeguard of FIG. 4A.
Figure 4C:
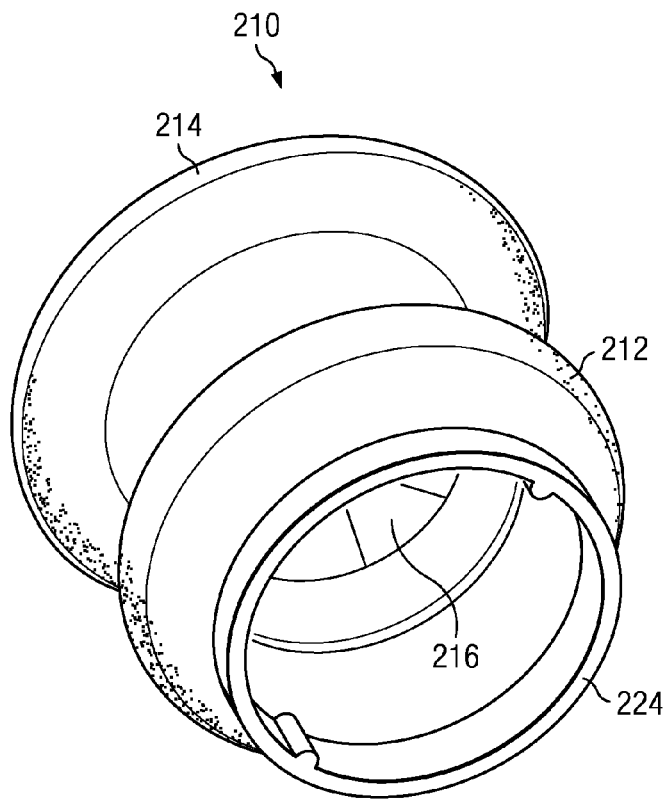
FIG. 4C shows an instrument-end perspective view of the eyeguard of FIG. 4A.
Figure 4D:
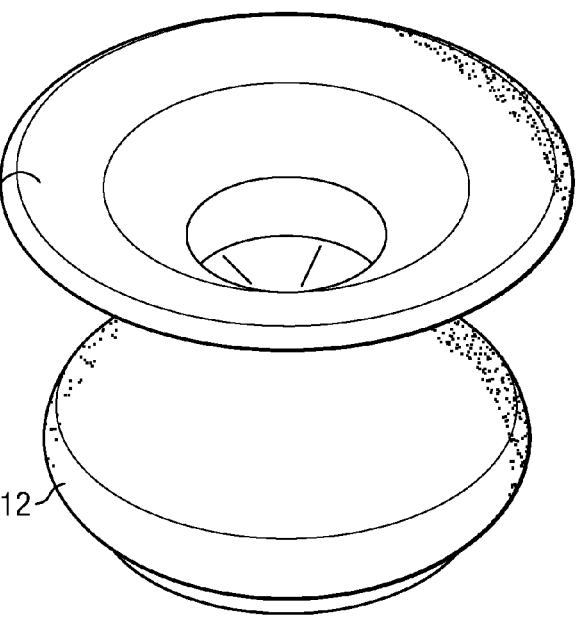
FIG. 4D shows another eye-end perspective view of the eyeguard of FIG. 4A.

Referring now to FIGS. 3A, 3B and 3C, there are shown a series of elevation views in cross-section, illustrating the eyeguard 210 in the configurations of FIGS. 2A, 2B and 2C, respectively, as the diaphragm moves from the closed configuration (FIG. 3A), through the first fully open position (FIG. 3B) and into the second fully open position (FIG. 3C). The structure is the same as previously described, therefore the corresponding parts are not separately numbered.

Referring now to FIGS. 4A-4D, there are shown additional perspective views of the eyeguard 210 to illustrate other design features. The diaphragm is in the fully closed position in these figures.

Figure 5A:
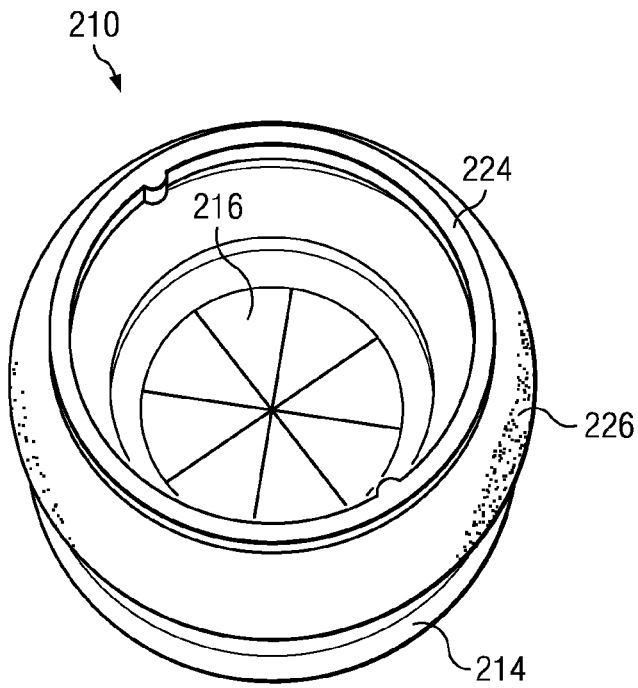
FIG. 5A shows an enlarged instrument-end perspective view of the eyeguard of FIG. 4A with the diaphragm in the fully closed position.
Figure 5B:
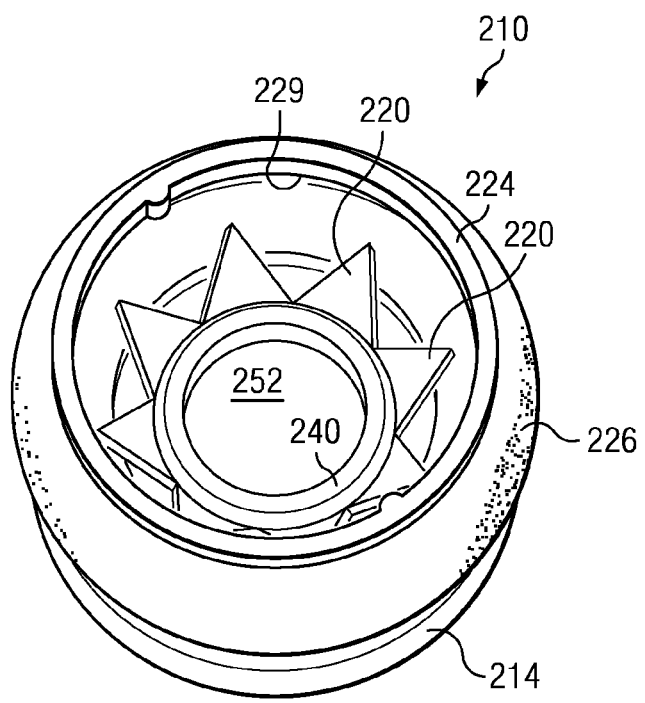
FIG. 5B shows the eyeguard of FIG. 5A with the diaphragm in the fully open position, with the diaphragm segments uncaptured by the instrument-end member, and with the eye-end member at a first eye-to-lens distance.
Figure 5C:
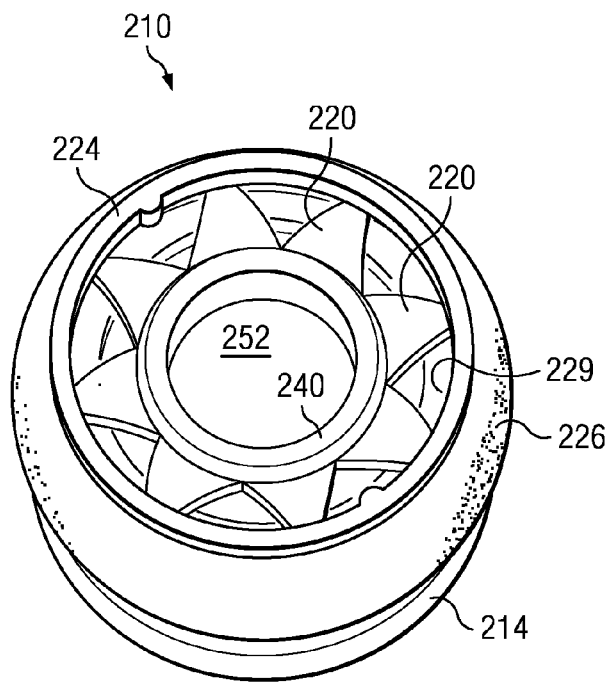
FIG. 5C shows the eyeguard of FIG. 5A with the diaphragm in the fully open position, with the diaphragm segments partially captured by the instrument-end member, and with the eye-end member at an intermediate eye-to-lens distance.
Figure 5D:
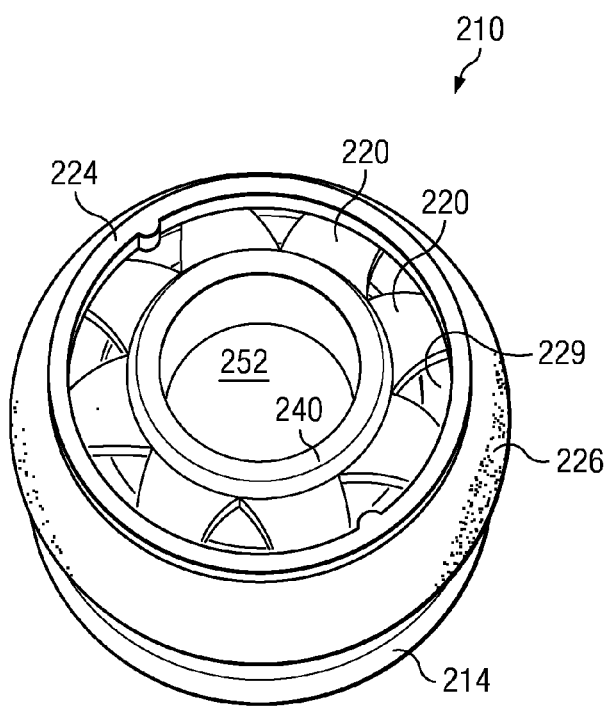
FIG. 5D shows the eyeguard of FIG. 5A with the diaphragm in the fully open position, with the diaphragm segments completely captured by the instrument-end member, and with the eye-end member at a second eye-to-lens distance.
Figure 6A:
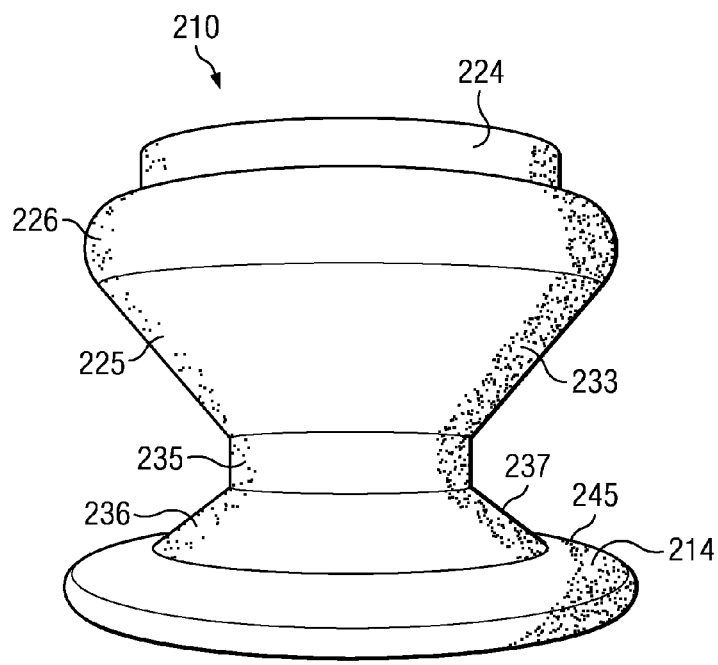
FIG. 6A shows a perspective side view of the eyeguard of FIGS. 5A-5D in the position shown in FIG. 5A.
Figure 6B:
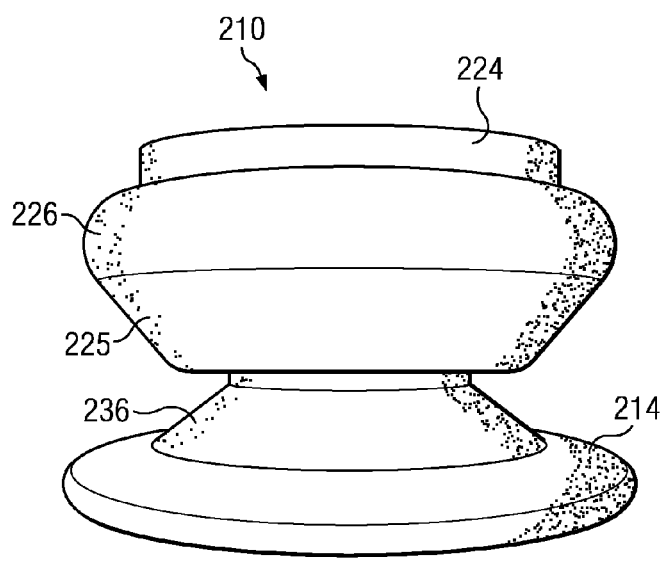
FIG. 6B shows the eyeguard of FIGS. 5A-5D in the position shown in FIG. 5B.
Figure 6C:
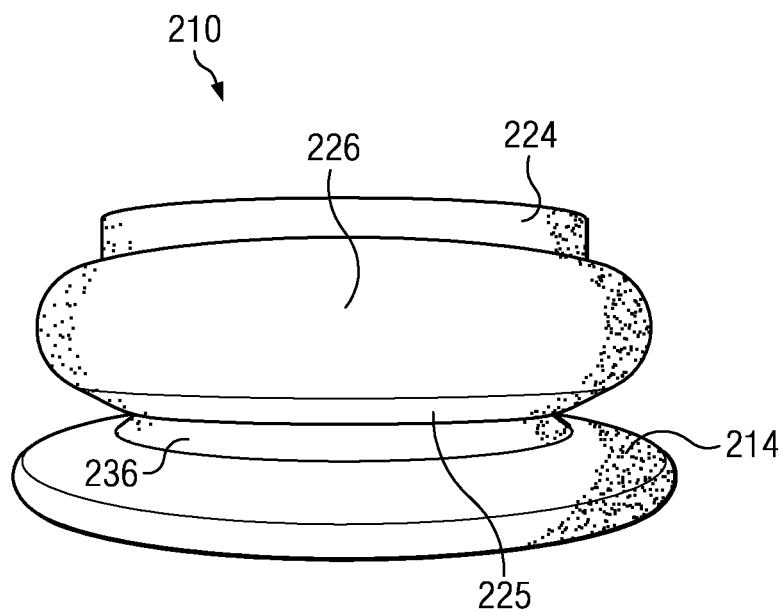
FIG. 6C shows the eyeguard of FIGS. 5A-5D in the position shown in FIG. 5C.
Figure 6D:
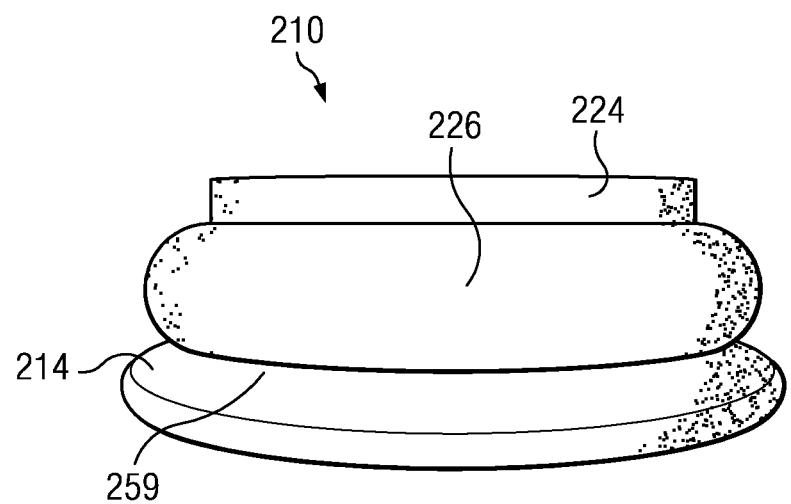
FIG. 6D shows the eyeguard of FIGS. 5A-5D in the position shown in FIG. 5D.

Referring now to FIGS. 5A-5D and FIGS. 6A-6D, there are shown additional views of the eyeguard 210 to further illustrate operation of the diaphragm segments 220 during translation of the eye-end member 214 into the instrument-end member 212. FIGS. 5A-5D are perspective end views of the eyeguard in a series of different configurations. FIGS. 6A-6D are perspective side views of the eyeguard in the same series of configurations. FIGS. 5A and 6A show the first configuration from different points of view. FIGS. 5B and 6B show the second configuration from different points of view and so on.

While in the preferred embodiment, an eyeguard according to the current invention consists of a single piece of molded elastomer, those skilled in the art will recognize that additional embodiments are within the scope of this invention. For example, some applications may require that portions of the instrument-end member and/or eye-end member be formed of rigid or semi-rigid materials. In such cases, first and second annular hinges 231 and 240, respectively, may each comprise molded elastomer, which is then connected through adhesives, thermal bonding, or other processes to the rigid or semi-rigid components of the eyeguard. In yet another embodiment, the eyeguard would comprise a diaphragm assembly comprising first and second annular hinges and a diaphragm, where this diaphragm assembly consists of a single piece of molded elastomer, which may then be affixed with adhesive, thermal bonding or other methods to the other components of the eyeguard.

Referring now to FIGS. 7A-7F, another eyeguard is illustrated in accordance with another embodiment of the invention. This embodiment provides user-selectable eye-to-lens travel that is divided into two or more discrete "stages." Each successive stage of user-selectable eye-to-lens travel requires the use of an activating force (F) that is correspondingly higher than the force required to activate the previous stage. Very long user-selectable eye-to-lens travels (cumulative) are possible with this embodiment.

Figure 7A:
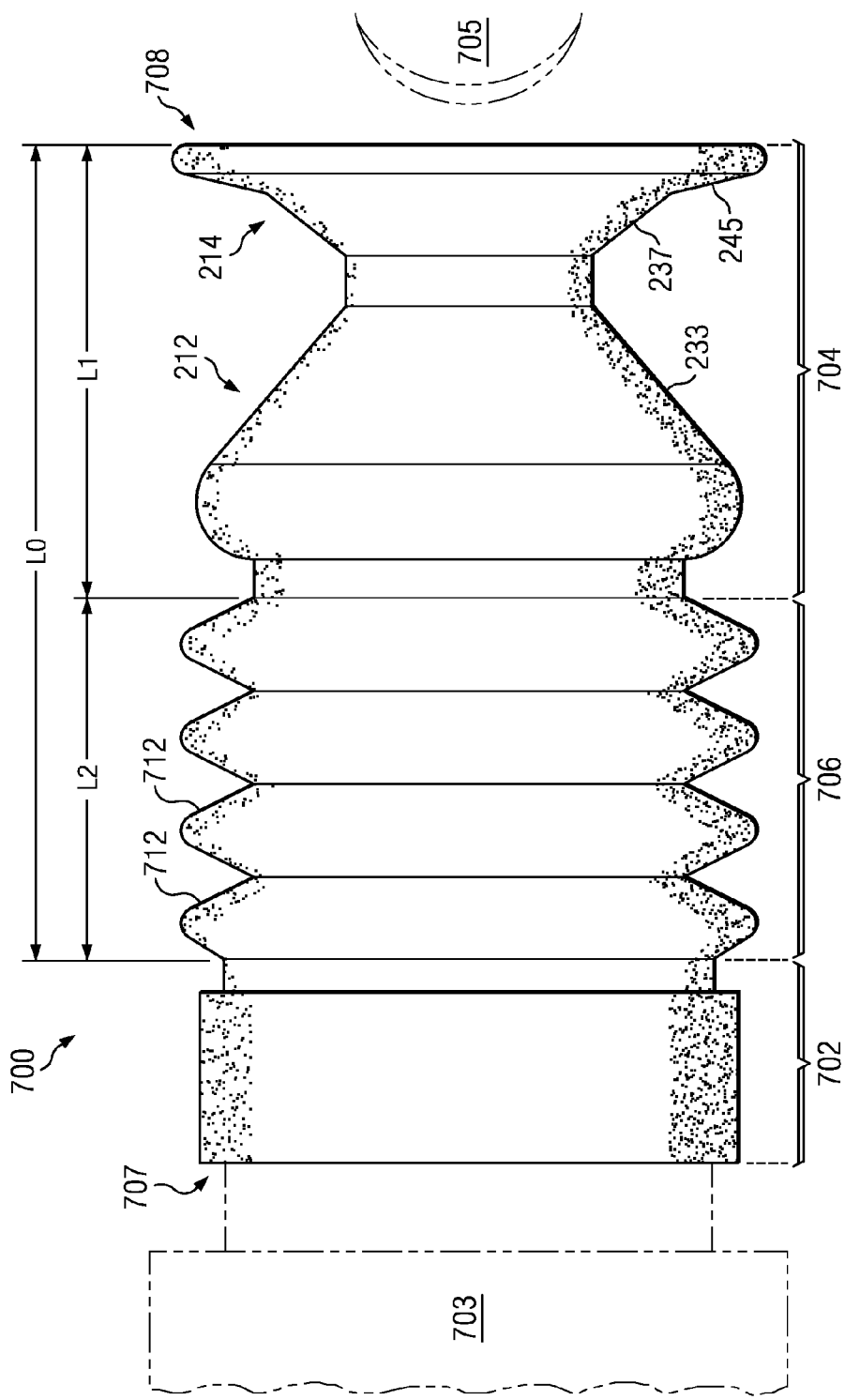
FIG. 7A is an elevation view of another eyeguard according to another embodiment.

Referring first to FIG. 7A, an external elevation view of the multi-stage eyeguard is shown. Eyeguard 700 comprises an instrument adapter 702 for connection to the selected optical instrument 703 (shown in broken line), a first stage section 704 for interfacing with the user 705 (represented by an eye shown in broken line) and at least one second stage section 706 connected therebetween. Although not visible in FIG. 7A, a pair of longitudinally aligned passageways run through the center of the eyeguard 700 between the instrument end 707 and the eye-end 708, and the passageways are separated by a user-activated diaphragm. In the relaxed configuration shown in FIG. 7A, the first stage section 704 has a first length denoted L1, the second stage section 706 has a second length denoted L2, and the active portion of the eyeguard (i.e., excluding the fixed-length instrument adapter) has an overall length denoted L0, which is substantially equal to L1+L2.

Figure 7B:
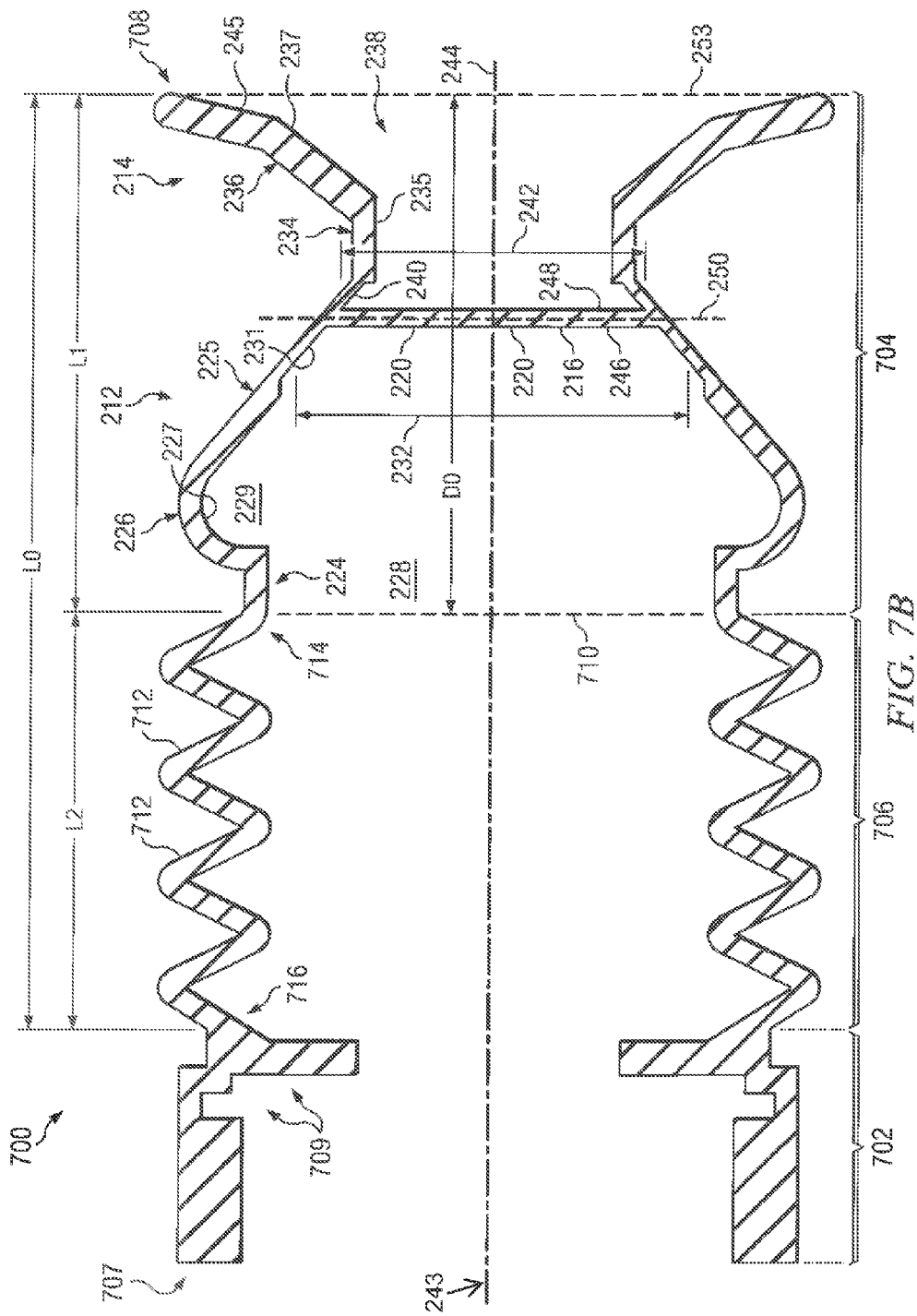
FIG. 7B is a midpoint wall section view of the eyeguard of FIG. 7A with the diaphragm in the closed position.

Referring now to FIG. 7B, a midpoint wall section view of the eyeguard 700 is shown, the eyeguard being in the identical relaxed configuration illustrated in FIG. 7A. It will be appreciated that, for purposes of illustration, only a section through the wall of the eyeguard is shown, i.e., the structure beyond the section plane is not shown.

The first stage section 704 of the eyeguard 700 provides light egress/ingress control via the user-activated diaphragm, and additionally provides user-selectable eye travel requiring a first value of operating force (denoted F1) to activate. In this embodiment, the first stage section 704 is substantially similar in structure and operation to the eyeguard 210 previously described herein, e.g., in connection with FIGS. 2A-2C, etc., and thus will not be described again in detail. Of course, the first portion 224 of the instrument-end member 212 is disposed proximate to the second stage section 706 rather than directly to the optical instrument. Similarly, the first passageway 228 extends onwards through the second stage section 706 and instrument adapter 702 and has a first longitudinal axis 243 alignable with the optical path of the associated optical instrument 703.

As in the eyeguard 210, the user-activated diaphragm 216 in the eyeguard 700 is disposed between the instrument-end member 212 and the eye-end member 214 of the first stage section 704. The diaphragm 216 comprises a plurality of segments 220, each segment 220 having an instrument-end side 246 joined to first flexible annular hinge 231 and an eye-end side 248 joined to second flexible annular hinge 240.

Each segment 220 is movable between a closed position (FIG. 7B) and an open position (FIGS. 7C, 7D, etc.) by the application of a first level of longitudinally directed user force F1. In FIG. 7B, the diaphragm 216 is shown in a closed position, wherein the segments 220 are disposed in a common plane 250 that intersects, and lies generally perpendicular to, the first and second longitudinal axes 243, 244, respectively, thereby blocking the passage of light rays between the first passageway 228 and the second passageway 238. The configuration illustrated in FIG. 7B is the "relaxed" or "natural" configuration of the eyeguard, i.e., the configuration it assumes when not subjected to external forces. The first stage section length L1 in the closed/relaxed configuration is the distance from the eye-end boundary 253 to the first stage/second stage boundary 710.

Referring now still to FIG. 7B, the second stage section 706 of the eyeguard 700 provides additional user-selectable eye travel; however, utilizing the second stage requires a second level of operating force (denoted F2) that is materially higher than the first level F1 required to operate the first stage section 704. In other words, applying the first level of force F1 to the eye-end member 214 sufficient to reduce the first stage length L1 by both the "required" eye travel distance (i.e., a distance=D0-D1) and the entire "user-selectable" eye travel distance (i.e., an additional distance=D1-D2), does not result in a substantial change in the active length L2 of the second stage section 706. In preferred embodiments, the application of the first level of force F1 produces less than 10 percent change in the active length L2. In more preferred embodiments, the application of the first level of force F1 produces less than 5 percent change in the active length L2.

In the embodiment of FIG. 7B, the second stage section comprises a plurality of sequentially disposed convolutions 712 connected at a first end 714 to the first stage section 704 and connected at a second end 716 to the instrument adapter 702. The convolutions 712 are configured, e.g., by selection of wall thickness, convolution angle, convolution height or other factors, to be relatively unresponsive to the application of a force having a magnitude less than or equal to F1, but to change readily upon the application of a force having a magnitude greater than or equal to F2.

Referring still to FIG. 7B, the instrument adapter 702 may be adapted as necessary for connection to associated optical instrument 703. In the embodiment shown, this adaptation takes the form of annular grooves and bosses 709 designed to interface with a complementary feature on the optical instrument 703; however, in other embodiments, adaptations having different configurations suited to the relevant optical instrument may be used. Alternatively, the instrument adapter 702 may further comprise a rigid adapter (not shown) such as a metallic ring, a polymer ring or other similar fitting so as to specifically adapt the instrument end 707 of the eyeguard 700 for connection to the optical instrument of choice.

Figure 7C:
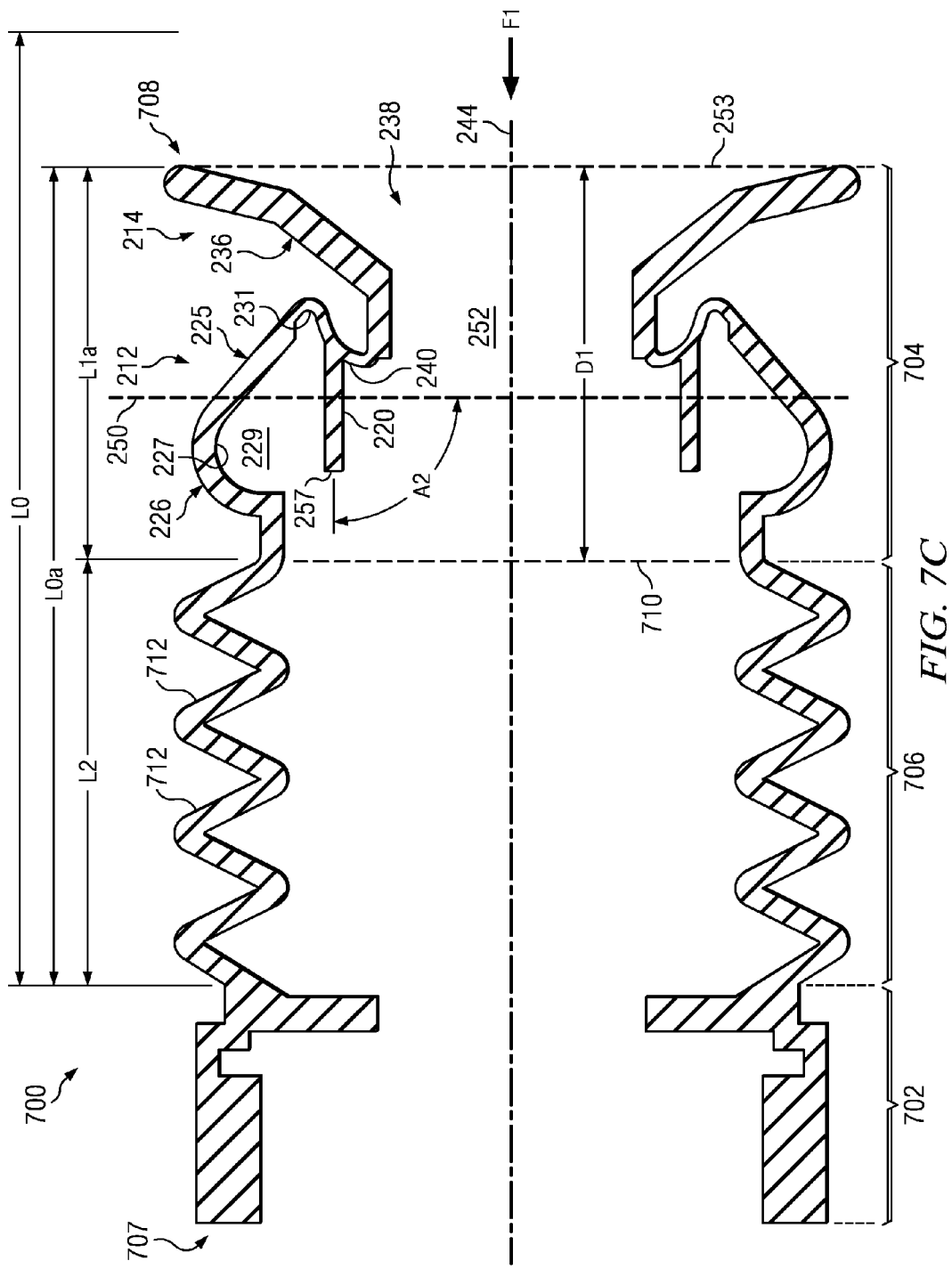
FIG. 7C shows the eyeguard of FIG. 7B with the diaphragm in the fully open position and the eye-end member at a first eye-to-lens distance.

Referring now to FIG. 7C, there is illustrated the configuration of the eyeguard 700 following the initial application of a first level of operating force less than or equal to F1. The first level of operating force is sufficient to cause the eye-end member 214 to travel towards the instrument end 707 until it reaches the first fully open position, wherein the segments 220 of the diaphragm 216 are completely open. The value of the length of the first stage section 704 thereby changes from L1 to L1a. The first level of operating force is not sufficient to activate the second stage section 706, thus the value of the length of the second stage section 706 remains at substantially the "relaxed" value, i.e., L2.

Figure 7D:
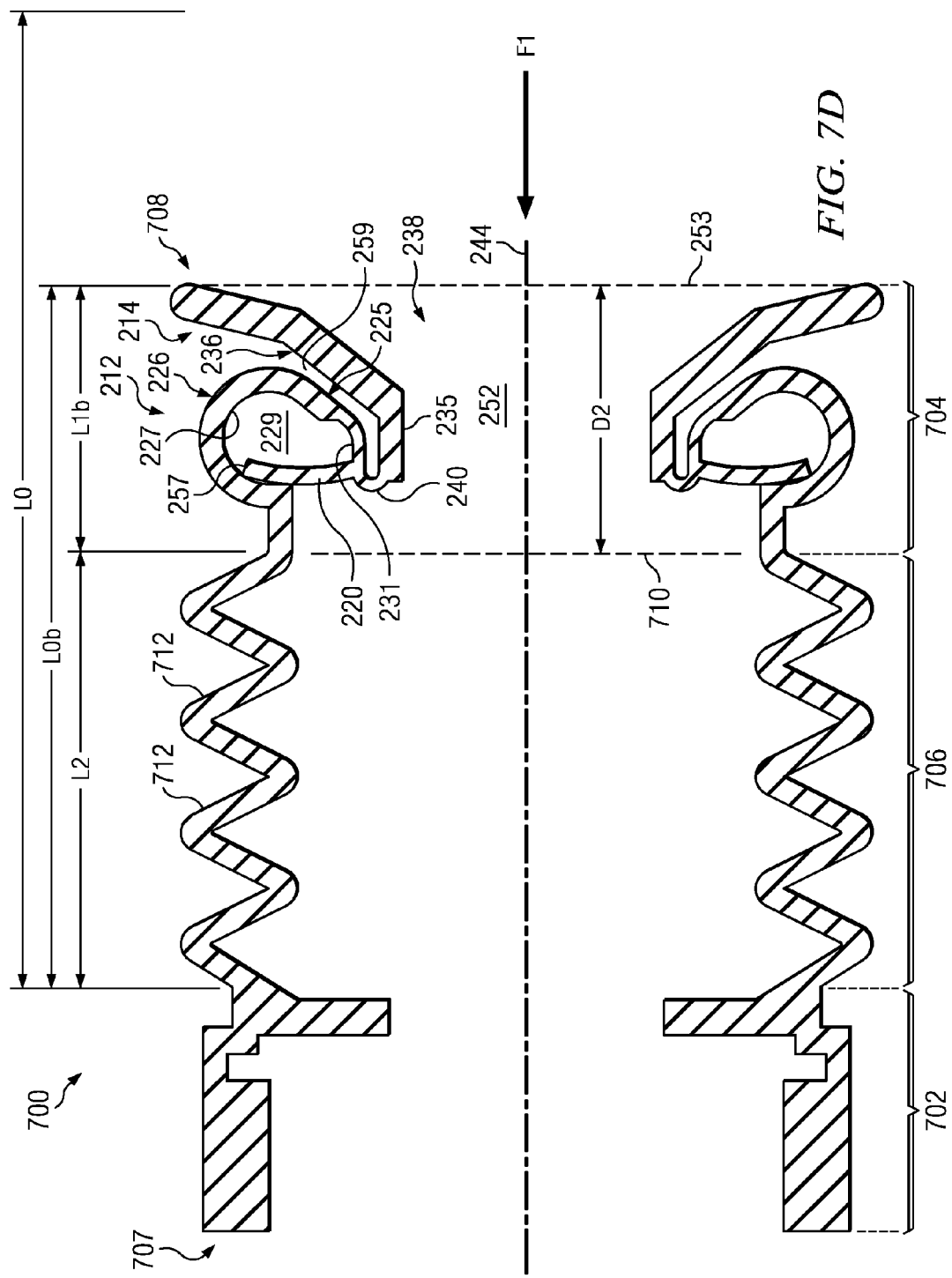
FIG. 7D shows the eyeguard of FIG. 7B with the diaphragm in the fully open position and the eye-end member at a second eye-to-lens distance.

Referring now to FIG. 7D, there is illustrated the configuration of the eyeguard 700 following the continued application of a first level of operating force less than or equal to F1. The further application of the first level of operating force causes the eye-end member 214 to continue traveling towards the instrument end 707 until it reaches the second fully open position, wherein the segments 220 of the diaphragm 216 are tucked into the pocket 229 and the exterior surface of the instrument-end member 212 abuts the exterior surface of the eye-end member. The value of the length of the first stage section 704 thereby changes from L1a to L1b. The first level of operating force is still not sufficient to activate the second stage section 706, thus the value of the length of the second stage section 706 remains at substantially the "relaxed" value, i.e., L2.

Figure 7E:
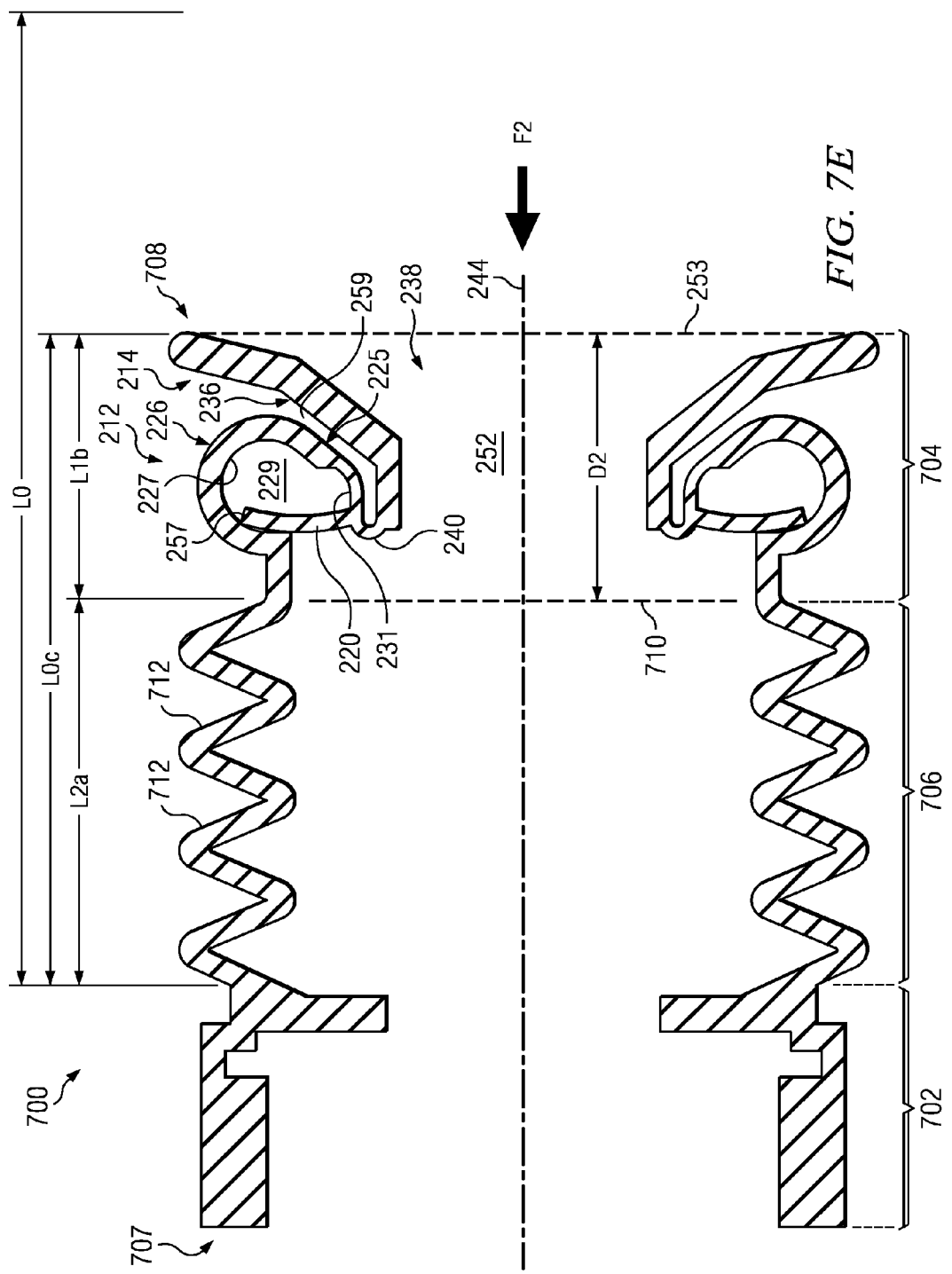
FIG. 7E shows the eyeguard of FIG. 7B with the diaphragm in the fully open position and the eye-end member at a third eye-to-lens distance.

Referring now to FIG. 7E, there is illustrated the configuration of the eyeguard 700 following the initial application of a second level of operating force greater than or equal to F2, where F2 is greater than F1. The application of the second level of operating force F2 keeps open the segments 220 of the diaphragm 216 of the first stage section 704, and keeps the eye-end member 214 abutted against the instrument-end member 212. This causes the entire first stage section 704 to travel towards the instrument end 707. The value of the length of the first stage section 704 thereby remains L1b. The second level of operating force F2 is also sufficient to activate the second stage, thereby changing the value of the length of the second stage section 706 from L2 to L2a.

Figure 7F:
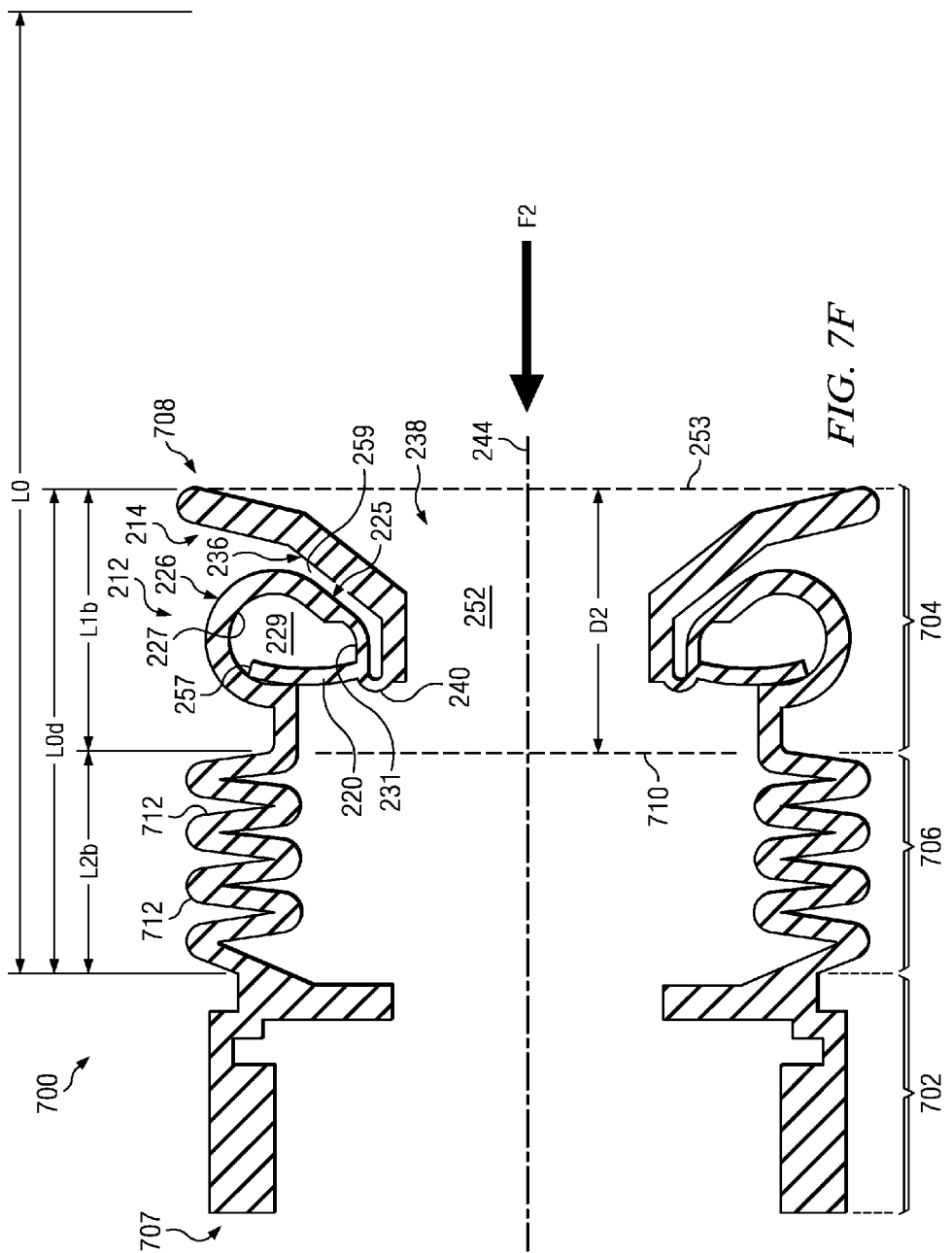
FIG. 7F shows the eyeguard of FIG. 7B with the diaphragm in the fully open position and the eye-end member at a fourth eye-to-lens distance.

Referring now to FIG. 7F, there is illustrated the configuration of the eyeguard 700 following the continued application of a second level of operating force greater than or equal to F2, where F2 is greater than F1. The continued application of the second level of operating force F2 still keeps open the segments 220 of the diaphragm 216 of the first stage section 704, and still keeps the eye-end member 214 abutted against the instrument-end member 212. The value of the length of the first stage section 704 thereby remains L1b. The entire first stage section 704 merely continues to travel towards the instrument end 707 until the second stage section 706 reaches a mechanical limit. In the embodiment shown, the mechanical limit of the second stage section is reached when the walls of convolutes 712 abut one another. The second level of operating force F2 has thus changed the value of the length of the second stage section 706 from L2 to its limit, i.e., L2b.

Figure 8B:
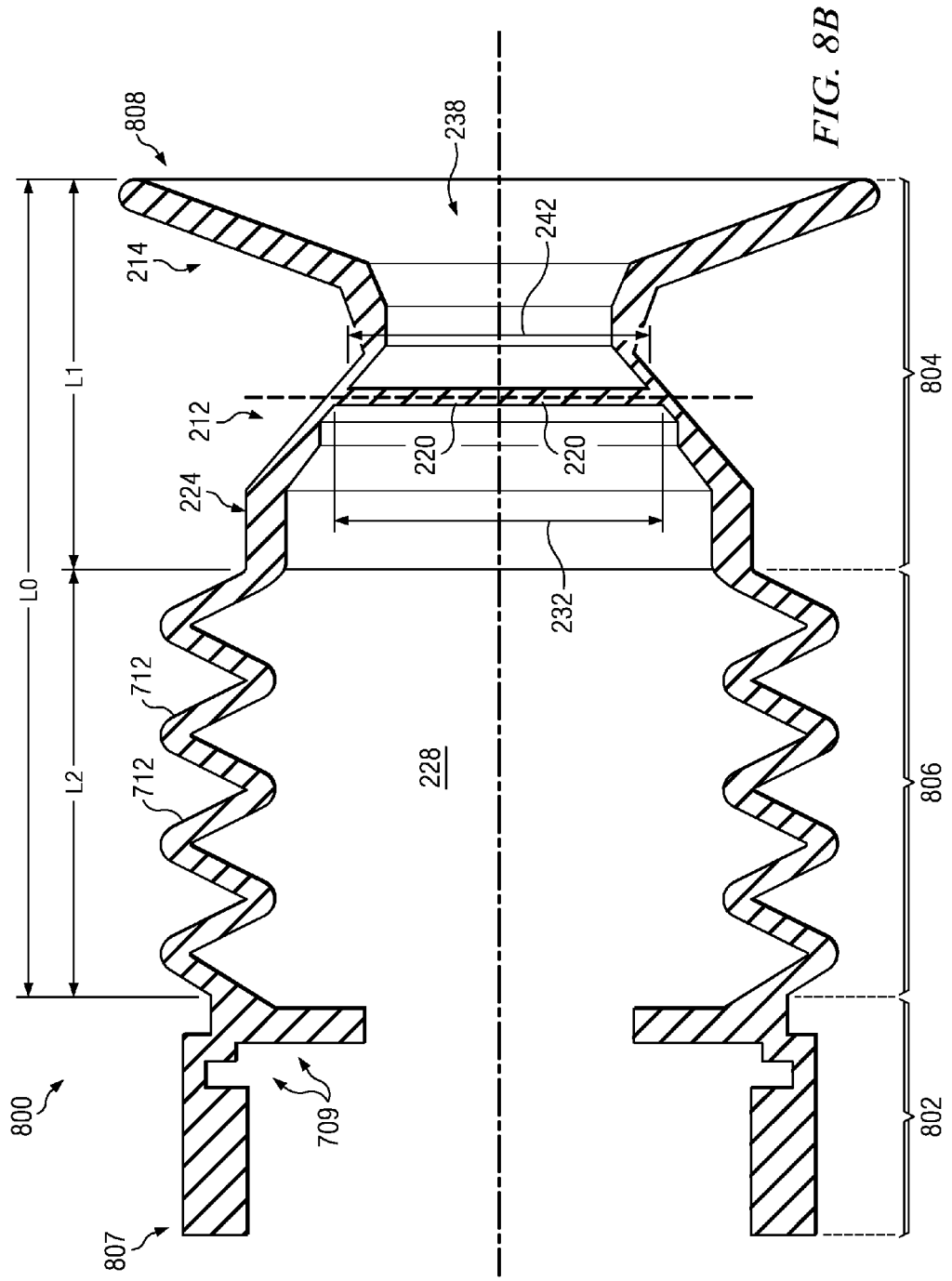
FIG. 8B is a midpoint wall section view of the eyeguard of FIG. 8A with the diaphragm in the closed position.

Referring now to FIGS. 8A-8B, yet another eyeguard is illustrated in accordance with yet another embodiment of the invention. This embodiment again provides multi-stage user-selectable eye-to-lens travel, where each successive stage of user-selectable eye-to-lens travel requires the use of an activating force (F) that is correspondingly higher than the force required to activate the previous stage. In this embodiment, however, the first level of operating force F1 acts primarily to operate the user-activated diaphragm to control light ingress/egress, whereas the second level of operating force F2, where F2 is greater than F1, serves to provide user-selectable eye-to-lens travel towards the instrument end 807.

Referring first to FIG. 8A, an external elevation view of the multi-stage eyeguard is shown. Eyeguard 800 comprises an instrument adapter 802 for connection to the selected optical instrument (not shown), a first stage section 804 for interfacing with the user (not shown) and at least one second stage section 806 connected therebetween. Although not visible in FIG. 8A, a pair of longitudinally aligned passageways run through the center of the eyeguard 800 between the instrument end 807 and the eye-end 808, and the passageways are separated by a user-activated diaphragm. In the relaxed configuration shown in FIG. 8A, the first stage section 804 has a first length denoted L1, the second stage section 706 has a second length denoted L2, and the active portion of the eye-guard (i.e., excluding the fixed-length instrument adapter) has an overall length denoted L0, which is substantially equal to L1+L2.

Referring now to FIG. 8B, a midpoint wall section view of the eyeguard 800 is shown, the eyeguard being in the identical relaxed configuration illustrated in FIG. 8A. In this embodiment, the first stage section 804 of the eyeguard 800 provides primarily light egress/ingress control via the user-activated diaphragm, requiring a first value F1 of operating force to activate. Little user-selectable eye-to-lens travel is provided by the first stage section 804. Thus, the first stage section 804 in this embodiment is substantially similar in structure and operation to the conventional eyeguards previously described herein, e.g., in connection with FIGS. 1A-1B, etc., and thus will not be described again in detail. Relevant features are numbered in accordance with the previous embodiment. The second stage section 806 of the eyeguard 800 provides the majority of the user-selectable eye travel, requiring a second value F2 of operating force to activate, which force F2 is materially higher than the first value F1 required for the first stage section 804. In other words, applying the first level of force F1 to the eye-end member 214 sufficient to reduce the first stage length L1 by the "required" eye travel distance (i.e., a distance=D0-D1), does not result in a substantial change in the active length L2 of the second stage section 806. In preferred embodiments, the application of the first level of force F1 produces less than 10 percent change in the active length L2. In more preferred embodiments, the application of the first level of force F1 produces less than 5 percent change in the active length L2. Operation of the eyeguard 800 is substantially analogous to that described in connection with FIGS. 7B-7F, and thus will not be repeated.

Although the preferred embodiment has been described in detail, it should be understood that various changes, substitutions and alterations can be made therein without departing from the spirit and scope of the invention as defined by the appended claims.

What is claimed is:

1. An eyeguard having an instrument end and an eye end, the eyeguard comprising:
    an instrument-end member, an eye-end member and a diaphragm disposed therebetween;
        the instrument-end member including
            a first portion disposed proximate to the instrument end,
            a second portion disposed proximate to the eye end and
            a third portion disposed between the first and second portions,
            wherein the first, second and third portions all have generally annular configurations defining a first continuous passageway therethrough along a first longitudinal axis;
            the first portion being adapted for connection to an optical instrument;
            the second portion including
                a first flexible annular hinge having a first diameter and a wall thickness, and
                an annular conic section having a wall disposed on the instrument-end side of the first annular hinge, the annular conic section having a wall thickness that is materially greater than the wall thickness of the first annular hinge, and
                the wall of the annular conic section defining a first angle, $A_{W1}$, with respect to the first longitudinal axis;

the third portion including an inward-curving bight that defines a pocket in the interior volume of the eyeguard;

the eye-end member including
  a fourth portion disposed proximate to the instrument end and
  a fifth portion disposed proximate to the eye end,
  wherein the fourth and fifth portions have generally annular configurations defining a second continuous passageway therethrough along a second longitudinal axis generally aligned with the first longitudinal axis;
  the fourth portion including
    a second flexible annular hinge having a second diameter and a wall thickness, the second diameter being less than the first diameter of the first annular hinge and
    a generally cylindrical section having a wall disposed on the eye-end side of the second annular hinge and extending longitudinally between the second annular hinge and the fifth portion, the cylindrical section having a wall thickness materially thicker than the wall thickness of the second annular hinge;
  the fifth portion including
    an eye-end section adapted to interface with the periocular region of a user's face and
    an annular conic section having a wall disposed on the instrument-end side of the eye-end section, the wall of the annular conic section defining a second angle, $A_{W2}$, with respect to the first and second longitudinal axes, and
  the diaphragm including
    a plurality of segments, each segment having an instrument-end side joined to the first flexible annular hinge and an eye-end side joined to the second flexible annular hinge;
    each segment being movable between a closed position and an open position;
wherein, when the eyeguard has a maximum instrument-end to eye-end distance D0, the diaphragm is in a closed position with the plurality of segments disposed in a common plane that intersects and lies generally perpendicular to the first and second longitudinal axes, respectively, thereby blocking the passage of light rays between the first passageway and the second passageway;

wherein, when the eye-end member moves longitudinally toward the instrument-end member until the eyeguard has a first instrument-end to eye-end distance D1, where D1 is less than D0, the size difference between first diameter of first annular hinge and second diameter of second annular hinge causes the annular hinges and to reverse their respective longitudinal positions (relative to the closed position) such that the diaphragm moves into a first fully open position wherein the plurality of segments are configured at a first angle, A2, within the range from about 85 degrees to about 115 degrees with respect to the common plane of the closed position, such that the plurality of segments do not obstruct the passage of light through the aperture between the first passageway and the second passageway, but all exterior surfaces of the second portion are still materially spaced-apart from corresponding exterior surfaces of the fifth portion; and wherein, when the eye-end member moves longitudinally toward the instrument end member until the eyeguard has a second instrument-end to eye-end distance D2, where D2 is less than D1, an exterior surface of the second portion abuts a corresponding exterior surface of the fifth portion and the plurality of segments form an angle A2 with respect to the common plane that is in excess of about 115 degrees and outer ends of the plurality of segments are trapped in the pocket formed by the inward-curving bight of third portion.

2. An eyeguard in accordance with claim 1, wherein the value of the angle $A_{W1}$ is within the range of about 42 degrees to about 48 degrees.

3. An eyeguard in accordance with claim 2, wherein the value of the angle $A_{W1}$ is about 45 degrees.

4. An eyeguard in accordance with claim 1, wherein, the value of the angle $A_{W2}$ is greater than the value of the angle $A_{W1}$.

5. An eyeguard in accordance with claim 4, wherein, the value of the angle $A_{W2}$ is within a range that is from 8 degrees to 12 degrees greater than the value of the angle $A_{W1}$.

6. An eyeguard in accordance with claim 4, wherein, the value of the angle $A_{W2}$ is within the range of about 53 degrees to about 62 degrees.

7. An eyeguard in accordance with claim 6, wherein, the value of the angle $A_{W2}$ is within the range of about 55 degrees to about 60 degrees.

8. An eyeguard in accordance with claim 1, wherein the value D1-D2 of the user-selectable eye-to-lens travel of the eyeguard after the diaphragm is fully open, i.e., necessary to move between the first and second fully open positions, is substantially equal to the value D0-D1 of the required eye-to-lens travel necessary to move from the fully closed position to the first fully open position.

9. An eyeguard in accordance with claim 8, wherein the value D1-D2 of the user-selectable eye-to-lens travel of the eyeguard is within the range from about 50% to about 150% of the value D0-D1 of the required eye-to-lens travel.

10. An eyeguard in accordance with claim 9, wherein the value D1-D2 of the user-selectable eye-to-lens travel of the eyeguard is within the range from about 75% to about 125% of the value D0-D1 of the required eye-to-lens travel.

11. An eyeguard having an instrument end and an eye end, the eyeguard comprising:
  an instrument adapter disposed at the instrument end, a first stage section disposed at the eye end, and a second stage section disposed therebetween;
  the instrument adapter being adapted for connection to an optical instrument;
  the first stage section including
    an instrument-end member, an eye-end member and a diaphragm disposed therebetween;
    the instrument-end member including
      a first portion disposed proximate to the instrument end,
      a second portion disposed proximate to the eye end and
      a third portion disposed between the first and second portions,
      wherein the first, second and third portions all have generally annular configurations defining a first continuous passageway therethrough along a first longitudinal axis;
      the first portion being connected to the eye-end of the second stage;
      the second portion including
        a first flexible annular hinge having a first diameter and a wall thickness, and an annular conic section having a wall disposed on the instrument-end side of the first annular hinge, the annular conic section having a wall thickness that is materially greater than the wall thickness of the first annular hinge, and the third portion including an inward-curving bight that defines a pocket in the interior volume of the eyeguard;

the eye-end member including a fourth portion disposed proximate to the instrument end and a fifth portion disposed proximate to the eye end, wherein the fourth and fifth portions have generally annular configurations defining a second continuous passageway therethrough along a second longitudinal axis generally aligned with the first longitudinal axis;

the fourth portion including a second flexible annular hinge having a second diameter and a wall thickness, the second diameter being less than the first diameter of the first annular hinge and a generally cylindrical section having a wall disposed on the eye-end side of the second annular hinge and extending longitudinally between the second annular hinge and the fifth portion, the cylindrical section having a wall thickness materially thicker than the wall thickness of the second annular hinge;

the fifth portion including an eye-end section adapted to interface with the periocular region of a user's face and an annular conic section having a wall disposed on the instrument-end side of the eye-end section, the diaphragm including a plurality of segments, each segment having an instrument-end side joined to the first flexible annular hinge and an eye-end side joined to the second flexible annular hinge;

each segment being movable between a closed position and an open position; and the second stage section including a plurality of sequentially disposed convolutions connected at a first end to the first stage section and connected at a second end to the instrument adapter;

wherein the convolutions of the second stage section are configured such that the application of a force F1 sufficient to cause the eye-end member of the first stage section to move longitudinally toward the instrument end member until an exterior surface of the second portion abuts a corresponding exterior surface of the fifth portion produces less than 10 percent change in the active length of the second stage section.

* * * * *